(12) United States Patent
Medoff

(10) Patent No.: US 7,971,809 B2
(45) Date of Patent: *Jul. 5, 2011

(54) FIBROUS MATERIALS AND COMPOSITES

(75) Inventor: Marshall Medoff, Brookline, MA (US)

(73) Assignee: Xyleco, Inc., Woburn, MA (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/859,325

(22) Filed: Sep. 21, 2007

(65) Prior Publication Data

US 2008/0206541 A1    Aug. 28, 2008

(51) Int. Cl.
*B02B 5/02*    (2006.01)

(52) U.S. Cl. ............... 241/29; 241/24.1; 241/24.29

(58) Field of Classification Search ........ 241/24.29, 241/24.1, 29, 24.2, 24.22, 78
See application file for complete search history.

(56) References Cited

U.S. PATENT DOCUMENTS

| | | | |
|---|---|---|---|
| 1,057,151 A * | 3/1913 | Howard ............ 241/28 |
| 1,405,944 A * | 2/1922 | Shartle ............ 241/24.29 |
| 1,824,221 A | 9/1931 | Mason |
| 1,897,620 A * | 2/1933 | Respess ............ 241/19 |
| 2,516,847 A | 8/1950 | Boehm |
| 2,519,442 A | 8/1950 | Delorme et al. |
| 2,558,378 A | 6/1951 | Petry |
| 2,635,976 A | 4/1953 | Meiler et al. |
| 2,658,828 A | 11/1953 | Pattilloch |
| 2,665,261 A | 1/1954 | Baker |
| 2,680,102 A | 6/1954 | Becher |
| 2,757,150 A | 7/1956 | Heritage |
| 2,789,903 A | 4/1957 | Lukman et al. |
| 2,877,953 A * | 3/1959 | Heritage et al. ............ 241/24.2 |
| 2,935,763 A | 5/1960 | Newman et al. |
| 3,308,218 A | 3/1967 | Wiegand et al. |
| 3,309,444 A | 3/1967 | Schueler |
| 3,493,527 A | 2/1970 | Schueler |
| 3,516,953 A | 6/1970 | Wood |
| 3,596,314 A | 8/1971 | Krugler |
| 3,645,939 A | 2/1972 | Gaylord |
| 3,671,615 A | 6/1972 | Price |
| 3,697,364 A | 10/1972 | Boustany |
| 3,709,845 A | 1/1973 | Boustany |
| 3,718,536 A | 2/1973 | Downs et al. |
| 3,836,412 A | 9/1974 | Boustany et al. |
| 3,878,143 A | 4/1975 | Baumann et al. |
| 3,888,810 A | 6/1975 | Shinomura |
| 3,943,079 A | 3/1976 | Hamed |

(Continued)

FOREIGN PATENT DOCUMENTS

AU    47811/90    1/1989

(Continued)

OTHER PUBLICATIONS

Dalvag et al., "The Efficiency of Cellulosic Fillers in Common Thermoplastics. Part II. Filling with Process Aids and Coupling Agents", International Journal of Polymeric Materials, 1985, vol. 11, pp. 9-38.

(Continued)

*Primary Examiner* — Faye Francis
(74) *Attorney, Agent, or Firm* — Celia H. Leber

(57) ABSTRACT

Methods of making fibrous materials are disclosed that include shearing a fiber source to provide a first fibrous material, and passing the first fibrous material through a first screen. Also, composites are disclosed that includes a fibrous material, a resin and a dye.

15 Claims, 23 Drawing Sheets

U.S. PATENT DOCUMENTS

| | | |
|---|---|---|
| 3,956,541 A | 5/1976 | Pringle |
| 3,956,555 A | 5/1976 | McKean |
| 3,985,927 A | 10/1976 | Norris et al. |
| 4,005,162 A | 1/1977 | Bucking |
| 4,016,232 A | 4/1977 | Pringle |
| 4,033,913 A | 7/1977 | Sunden |
| 4,045,603 A | 8/1977 | Smith |
| 4,056,591 A | 11/1977 | Goettler et al. |
| 4,058,580 A | 11/1977 | Flanders |
| 4,097,648 A | 6/1978 | Pringle |
| 4,112,038 A | 9/1978 | Garner |
| 4,113,908 A | 9/1978 | Shinomura |
| 4,115,497 A | 9/1978 | Halmo et al. |
| 4,145,389 A | 3/1979 | Smith |
| 4,168,251 A | 9/1979 | Schinzel et al. |
| 4,187,352 A | 2/1980 | Klobbie |
| 4,203,876 A | 5/1980 | Dereppe et al. |
| 4,204,010 A | 5/1980 | Kramm et al. |
| 4,228,116 A | 10/1980 | Colombo et al. |
| 4,239,679 A | 12/1980 | Rolls et al. |
| 4,244,847 A | 1/1981 | Posiviata et al. |
| 4,244,903 A | 1/1981 | Schnause |
| 4,248,743 A | 2/1981 | Goettler |
| 4,248,820 A | 2/1981 | Haataja |
| 4,250,222 A | 2/1981 | Mavel et al. |
| 4,263,184 A | 4/1981 | Leo et al. |
| 4,265,846 A | 5/1981 | Shen et al. |
| 4,273,688 A | 6/1981 | Porzel et al. |
| 4,277,428 A | 7/1981 | Luck et al. |
| 4,279,790 A | 7/1981 | Nakajima |
| 4,281,039 A | 7/1981 | Miura et al. |
| 4,290,988 A | 9/1981 | Nopper et al. |
| 4,303,019 A | 12/1981 | Haataja et al. |
| 4,305,901 A | 12/1981 | Prince et al. |
| 4,311,554 A | 1/1982 | Herr |
| 4,311,621 A | 1/1982 | Nishizawa et al. |
| 4,318,351 A | 3/1982 | Munk |
| 4,323,625 A | 4/1982 | Coran et al. |
| 4,328,136 A | 5/1982 | Blount |
| 4,376,144 A | 3/1983 | Goettler |
| 4,382,108 A | 5/1983 | Carroll et al. |
| 4,393,020 A | 7/1983 | Li et al. |
| 4,414,267 A | 11/1983 | Coran et al. |
| 4,420,351 A | 12/1983 | Lussi et al. |
| 4,426,470 A | 1/1984 | Wessling et al. |
| 4,433,813 A * | 2/1984 | Whatton et al. ............... 241/21 |
| 4,440,708 A | 4/1984 | Haataja et al. |
| 4,454,091 A | 6/1984 | Chion et al. |
| 4,455,709 A | 6/1984 | Zanini |
| 4,458,629 A | 7/1984 | Gerber |
| 4,480,061 A | 10/1984 | Coughlin et al. |
| 4,481,701 A | 11/1984 | Hewitt |
| 4,491,553 A | 1/1985 | Yamada et al. |
| 4,503,115 A | 3/1985 | Hemels et al. |
| 4,505,869 A | 3/1985 | Nishibori |
| 4,506,037 A | 3/1985 | Suzuki et al. |
| 4,508,595 A | 4/1985 | Gasland |
| 4,520,530 A | 6/1985 | Pinto |
| 4,551,294 A | 11/1985 | Wottka et al. |
| 4,559,376 A | 12/1985 | Kubat |
| 4,562,218 A | 12/1985 | Fornadel et al. |
| 4,584,357 A | 4/1986 | Harding |
| 4,594,372 A | 6/1986 | Natov et al. |
| 4,597,928 A | 7/1986 | Terentiev et al. |
| 4,608,922 A | 9/1986 | Pohl |
| 4,610,900 A | 9/1986 | Nishibori |
| 4,624,890 A | 11/1986 | Lloyd et al. |
| 4,632,170 A | 12/1986 | Pohl |
| 4,645,631 A | 2/1987 | Hegenstaller et al. |
| 4,659,754 A | 4/1987 | Edwards et al. |
| 4,663,225 A | 5/1987 | Farley et al. |
| 4,674,414 A | 6/1987 | Nülle et al. |
| 4,686,251 A | 8/1987 | Ostermann et al. |
| 4,687,793 A | 8/1987 | Motegi et al. |
| 4,713,291 A | 12/1987 | Sasaki et al. |
| 4,716,062 A | 12/1987 | Klein |
| 4,717,742 A | 1/1988 | Beshay |
| 4,717,743 A | 1/1988 | Wakabayashi et al. |
| 4,734,236 A | 3/1988 | Davis |
| 4,737,532 A | 4/1988 | Fujita et al. |
| 4,738,723 A | 4/1988 | Frizzell et al. |
| 4,746,688 A | 5/1988 | Bistak et al. |
| 4,769,109 A | 9/1988 | Tellvik et al. |
| 4,769,274 A | 9/1988 | Tellvik et al. |
| 4,791,020 A | 12/1988 | Kokta |
| 4,810,445 A | 3/1989 | Lamb, Sr. et al. |
| 4,818,604 A | 4/1989 | Tock |
| 4,833,181 A | 5/1989 | Narukawa et al. |
| 4,851,458 A | 7/1989 | Hopperdietzel |
| 4,865,788 A | 9/1989 | Davis |
| 4,874,095 A | 10/1989 | Warych |
| 4,894,192 A | 1/1990 | Warych |
| 4,911,700 A | 3/1990 | Makoui et al. |
| 4,915,764 A | 4/1990 | Miani |
| 4,927,579 A | 5/1990 | Moore |
| 4,929,498 A | 5/1990 | Suskind et al. |
| 4,935,182 A | 6/1990 | Ehner et al. |
| 4,944,734 A | 7/1990 | Wallach |
| 4,960,548 A | 10/1990 | Ikeda et al. |
| 4,963,603 A | 10/1990 | Felegi, Jr. et al. |
| 4,968,463 A | 11/1990 | Levasseur |
| 4,973,440 A | 11/1990 | Tamura et al. |
| 4,978,489 A | 12/1990 | Radvan et al. |
| 4,988,478 A | 1/1991 | Held |
| 5,002,713 A | 3/1991 | Palardy et al. |
| 5,008,310 A | 4/1991 | Beshay |
| 5,009,586 A | 4/1991 | Pallmann |
| 5,017,319 A | 5/1991 | Shen |
| 5,028,266 A | 7/1991 | Rettenmaier |
| 5,057,167 A | 10/1991 | Gersbeck |
| 5,064,692 A | 11/1991 | Hofmann et al. |
| 5,075,057 A | 12/1991 | Hoedl |
| 5,075,359 A | 12/1991 | Castagna et al. |
| 5,082,605 A | 1/1992 | Brooks et al. |
| 5,084,135 A | 1/1992 | Brooks et al. |
| 5,087,400 A | 2/1992 | Theuveny |
| 5,088,910 A | 2/1992 | Goforth et al. |
| 5,093,058 A | 3/1992 | Harmon et al. |
| 5,096,406 A | 3/1992 | Brooks et al. |
| 5,100,545 A | 3/1992 | Brooks |
| 5,100,603 A | 3/1992 | Neefe |
| 5,102,055 A | 4/1992 | Buschmann et al. |
| 5,104,411 A | 4/1992 | Makoui et al. |
| 5,120,776 A | 6/1992 | Raj et al. |
| 5,124,519 A | 6/1992 | Roy et al. |
| 5,134,023 A | 7/1992 | Hsu |
| 5,137,668 A | 8/1992 | Lamb, Sr. |
| 5,155,147 A | 10/1992 | Dietz et al. |
| 5,164,432 A | 11/1992 | Dehennau et al. |
| 5,183,837 A | 2/1993 | Lepori et al. |
| 5,194,461 A | 3/1993 | Bergquist et al. |
| 5,213,021 A | 5/1993 | Goforth et al. |
| 5,234,171 A * | 8/1993 | Fantacci ..................... 241/24.14 |
| 5,254,617 A | 10/1993 | Inoue et al. |
| 5,268,074 A | 12/1993 | Brooks et al. |
| 5,277,758 A | 1/1994 | Brooks et al. |
| 5,284,610 A | 2/1994 | Tai |
| 5,285,973 A | 2/1994 | Goforth et al. |
| 5,298,102 A | 3/1994 | Pohl |
| 5,331,087 A | 7/1994 | Menges |
| 5,350,370 A | 9/1994 | Jackson et al. |
| 5,351,895 A | 10/1994 | Brooks et al. |
| 5,366,790 A | 11/1994 | Liebel |
| 5,372,878 A | 12/1994 | Saito |
| 5,374,474 A | 12/1994 | Pratt et al. |
| 5,380,180 A | 1/1995 | Lamb, Sr. |
| 5,406,768 A | 4/1995 | Giuseppe et al. |
| 5,416,139 A | 5/1995 | Zeiszler |
| 5,421,205 A | 6/1995 | Pohl |
| 5,432,000 A | 7/1995 | Young, Sr. et al. |
| 5,437,766 A | 8/1995 | Van Phan et al. |
| 5,439,542 A | 8/1995 | Liebel |
| 5,439,749 A | 8/1995 | Klasell et al. |
| 5,441,801 A | 8/1995 | Deaner et al. |
| 5,480,602 A | 1/1996 | Nagaich |
| 5,486,553 A | 1/1996 | Deaner et al. |
| 5,497,594 A | 3/1996 | Giuseppe et al. |

| | | | | | | |
|---|---|---|---|---|---|---|
| 5,498,478 | A | 3/1996 | Hansen et al. | 6,680,090 | B2 | 1/2004 | Godavarti et al. |
| 5,516,472 | A | 5/1996 | Laver | 6,682,789 | B2 | 1/2004 | Godavarti et al. |
| 5,516,585 | A | 5/1996 | Young, Sr. et al. | 6,685,858 | B2 | 2/2004 | Korney, Jr. et al. |
| 5,518,677 | A | 5/1996 | Deaner et al. | 6,692,825 | B2 | 2/2004 | Qin et al. |
| 5,539,027 | A | 7/1996 | Deaner et al. | 6,730,249 | B2 | 5/2004 | Sears et al. |
| 5,540,244 | A | 7/1996 | Brooks et al. | 6,743,507 | B2 | 6/2004 | Barlow et al. |
| 5,543,205 | A | 8/1996 | Liebel | 6,746,976 | B1 | 6/2004 | Urankar et al. |
| 5,547,745 | A | 8/1996 | Hansen et al. | 6,758,996 | B2 | 7/2004 | Monovoukas et al. |
| 5,558,933 | A | 9/1996 | Anthony | 6,780,359 | B1 | 8/2004 | Zehner et al. |
| 5,571,618 | A | 11/1996 | Hansen et al. | 6,784,230 | B1 | 8/2004 | Patterson et al. |
| 5,574,094 | A | 11/1996 | Malucelli et al. | 6,821,614 | B1 | 11/2004 | Dubelsten et al. |
| 5,582,682 | A | 12/1996 | Ferretti | 6,824,729 | B2 | 11/2004 | Oin et al. |
| 5,582,847 | A | 12/1996 | Peterson et al. | 6,855,182 | B2 | 2/2005 | Sears |
| 5,585,150 | A | 12/1996 | Sheehan | 6,969,781 | B2 | 11/2005 | Graef et al. |
| 5,585,155 | A | 12/1996 | Heikkila et al. | 7,708,214 | B2 * | 5/2010 | Medoff .......................... 241/28 |
| 5,614,570 | A | 3/1997 | Hansen et al. | 2002/0010229 | A1 | 1/2002 | Medoff et al. |
| 5,618,858 | A | 4/1997 | Hauschildt et al. | 2002/0019614 | A1 | 2/2002 | Woon et al. |
| 5,643,359 | A | 7/1997 | Soroushian et al. | 2003/0021915 | A1 | 1/2003 | Rohatgi et al. |
| 5,643,635 | A | 7/1997 | Ahn et al. | 2003/0032702 | A1 | 2/2003 | Medoff et al. |
| 5,663,216 | A | 9/1997 | Tomka | 2003/0100634 | A1 | 5/2003 | Heath et al. |
| 5,682,015 | A | 10/1997 | Harben | 2003/0121380 | A1 | 7/2003 | Cowell et al. |
| 5,695,874 | A | 12/1997 | Deaner et al. | 2003/0125688 | A1 | 7/2003 | Keane et al. |
| 5,746,958 | A | 5/1998 | Gustafsson et al. | 2003/0187102 | A1 | 10/2003 | Medoff et al. |
| 5,759,680 | A | 6/1998 | Brooks et al. | 2003/0207064 | A1 | 11/2003 | Bunyan et al. |
| 5,767,177 | A | 6/1998 | Omente et al. | 2004/0005461 | A1 | 1/2004 | Nagel et al. |
| 5,773,138 | A | 6/1998 | Seethamraju et al. | 2004/0072924 | A1 | 4/2004 | Sigworth et al. |
| 5,791,262 | A | 8/1998 | Knight et al. | 2004/0140069 | A1 * | 7/2004 | Selin .................................. 162/4 |
| 5,819,491 | A | 10/1998 | Davis | 2005/0080168 | A1 | 4/2005 | Medoff et al. |
| 5,824,246 | A | 10/1998 | Reetz | 2005/0200050 | A1 | 9/2005 | Medoff et al. |
| 5,827,607 | A | 10/1998 | Deaner et al. | 2006/0240109 | A1 | 10/2006 | Medoff et al. |
| 5,851,469 | A | 12/1998 | Muller et al. | 2006/0247336 | A1 | 11/2006 | Medoff et al. |
| 5,871,162 | A * | 2/1999 | Rajewski ..................... 241/100 | 2007/0015855 | A1 | 1/2007 | Medoff et al. |
| 5,876,641 | A | 3/1999 | LeClair et al. | | | | |
| 5,882,564 | A | 3/1999 | Puppin | | | | |

FOREIGN PATENT DOCUMENTS

| | | |
|---|---|---|
| DE | 43 31 747 | 3/1995 |
| EP | 0801168 A1 | 10/1977 |
| EP | 0 161 766 A1 | 11/1985 |
| EP | 0 330 729 A1 | 9/1988 |
| EP | 0 409 525 A2 | 7/1990 |
| EP | 1 207 740 B1 | 6/2000 |
| EP | 1 015 242 B1 | 4/2006 |
| GB | 1503103 A1 | 3/1978 |
| GB | 2171953 | 9/1986 |
| JP | 60-168611 | 2/1985 |
| JP | 61-273805 | 2/1988 |
| JP | 63-033441 | 2/1988 |
| JP | 63-033442 | 2/1988 |
| JP | 63-033448 | 2/1988 |
| WO | 9207995 A1 | 5/1992 |
| WO | WO 92/07022 | 10/1992 |
| WO | WO 95/08954 | 3/1995 |
| WO | WO 96/13468 | 5/1996 |
| WO | WO 96/13551 | 5/1996 |
| WO | WO 97/06942 | 2/1997 |
| WO | WO 97/18173 | 5/1997 |
| WO | WO 99/11453 | 3/1999 |
| WO | WO 99/23138 | 5/1999 |
| WO | WO 00/29183 | 5/2000 |
| WO | WO 00/34567 | 6/2000 |
| WO | WO 00/78127 A1 | 12/2000 |
| WO | WO 02/14039 A1 | 2/2002 |
| WO | WO 03/079763 A1 | 10/2003 |

Additional entries continued:

| | | | |
|---|---|---|---|
| 5,932,334 | A | 8/1999 | Deaner et al. |
| 5,948,505 | A | 9/1999 | Puppin |
| 5,948,524 | A | 9/1999 | Seethamraju et al. |
| 5,952,105 | A | 9/1999 | Medoff et al. |
| 5,973,035 | A | 10/1999 | Medoff et al. |
| 5,981,067 | A | 11/1999 | Seethamraju et al. |
| 5,985,429 | A | 11/1999 | Plummer et al. |
| 6,004,668 | A | 12/1999 | Deaner et al. |
| 6,007,656 | A | 12/1999 | Heikkila et al. |
| 6,015,611 | A | 1/2000 | Deaner et al. |
| 6,015,612 | A | 1/2000 | Deaner et al. |
| 6,029,916 | A * | 2/2000 | White ..................... 241/24.19 |
| 6,054,207 | A | 4/2000 | Finley |
| 6,085,923 | A | 7/2000 | Yaniger |
| 6,106,944 | A | 8/2000 | Heikkila et al. |
| 6,117,924 | A | 9/2000 | Brandt |
| 6,122,877 | A | 9/2000 | Hendrickson et al. |
| 6,180,257 | B1 | 1/2001 | Brandt et al. |
| 6,200,682 | B1 | 3/2001 | Dubelsten et al. |
| 6,207,729 | B1 | 3/2001 | Medoff et al. |
| 6,210,792 | B1 | 4/2001 | Seethamraju et al. |
| 6,258,876 | B1 | 7/2001 | Medoff et al. |
| 6,265,037 | B1 | 7/2001 | Godavarti et al. |
| 6,270,883 | B1 | 8/2001 | Sears et al. |
| 6,270,893 | B1 | 8/2001 | Young, Sr. et al. |
| 6,284,098 | B1 | 9/2001 | Jacobsen |
| 6,322,664 | B1 * | 11/2001 | Witek ............................. 162/4 |
| 6,337,138 | B1 | 1/2002 | Zehner et al. |
| 6,344,268 | B1 | 2/2002 | Stucky et al. |
| 6,346,160 | B1 | 2/2002 | Puppin |
| 6,357,197 | B1 | 3/2002 | Serino et al. |
| 6,409,952 | B1 | 6/2002 | Hacker et al. |
| 6,420,626 | B1 | 7/2002 | Erspamer et al. |
| 6,425,979 | B1 | 7/2002 | Hansen et al. |
| 6,448,307 | B1 | 9/2002 | Medoff et al. |
| 6,479,002 | B1 | 11/2002 | Becker et al. |
| 6,495,225 | B1 | 12/2002 | Nakajima et al. |
| 6,511,757 | B1 | 1/2003 | Brandt et al. |
| 6,521,087 | B2 | 2/2003 | Hansen et al. |
| 6,605,245 | B1 | 8/2003 | Dubelsten et al. |
| 6,617,376 | B2 | 9/2003 | Korney, Jr. et al. |
| 6,620,503 | B2 | 9/2003 | Qin et al. |
| 6,632,863 | B2 | 10/2003 | Hutchison et al. |
| 6,638,612 | B2 | 10/2003 | Jones |
| 6,670,035 | B2 | 12/2003 | Pittman et al. |

OTHER PUBLICATIONS

Klason et al., "The Efficiency of Cellulosic Fillers in Common Thermoplastics. Part I. Filling Without Processing Aids or Coupling Agents", International Journal of Polymeric Materials, Mar. 1984, pp. 159-187.

Kokta et al., "Composites of Poly(Vinyl Chloride) and Wood Fibers. Part II: Effect of Chemical Treatment", Polymer Composites, Apr. 1990, vol. 11, No. 2, pp. 84-89.

Kokta et al., "Composites of Polyvinyl Chloride-Wood Fibers. I. Effect of Isocyanate as a Bonding Agent", Polym. Plast. Technol. Eng. 29(1&2), 1990, pp. 87-118.

Kokta et al., "Composites of Polyvinyl Chloride-Wood Fibers. III. Effect of Silane as Coupling Agent", Journal of Vinyl Technology, Sep. 1990, vol. 12, No. 3, pp. 146-153.

Kokta et al., "Use of Grafted Wood Fibers in Thermoplastic Composites V. Polystyrene", pp. 85-96.

Kokta et al., "Use of Wood Fibers in Thermoplastic Composites", Polymer Composites, Oct. 1983, vol. 4, No. 4, pp. 229-232.

Maldas et al., "Composites of Polyvinyl Chloride-Wood Fibers: IV. Effect of the Nature of Fibers", Journal of Vinyl Technology, Jun. 1989, vol. 11, No. 2, pp. 90-98.

Raj et al., "Use of Wood Fibers as Filler in Common Thermoplastic Studies on Mechanical Properties", Science and Engineering of Composite Materials, vol. 1, No. 3, 1989, pp. 85-98.

Raj et al., "Use of Wood Fibers in Thermoplastics. VII. The Effect of Coupling Agents in Polyethylene-Wood Fiber Composites", Journal of Applied Polymer Science, vol. 37, (1989), pp. 1089-1103.

Rogalski et al., "Poly(Vinyl-Chloride) Wood Fiber Composites", Antec '87, pp. 1436-1441.

Woodhams et al., "Wood Fibers as Reinforcing Fillers for Polyolefins", Polymer Engineering and Science, Oct. 1984, vol. 24, No. 15, pp. 1166-1171.

Yam et al., "Composites From Compounding Wood Fibers With Recycled High Density Polyethylene", Polymer Engineering and Science, Mid-Jun. 1990, vol. 30, No. 11, pp. 693-699.

Zadorecki et al., "Future Prospects for Wood Cellulose as Reinforcement in Organic Polymer Composites", Polymer Composites, Apr. 1989, vol. 10, No. 2, pp. 69-77.

Supplementary European Search Report, EP 03 71 1572, Feb. 28, 2005.

Abstract of JP 09213296, filed Feb. 5, 1996, in Chemical Abstracts 127:223004.

Abstract of JP 09267441, filed Oct. 14, 1997, in Chemical Abstracts 127:294599.

Abstract of (Doctorate) Dissertation Abstract Int. B1988, 58(9), 4962 (published in Sep. 1997), in Chemical Abstracts 128:128805.

ESR for EP Application No. 06739443.7-2307/1877192 (PCT/US2006/010648), mailed Mar. 3, 2010, 11 pages.

Communication Pursuant to Article 94(3) EPC for EP Application No. 06739443.7-2307/1877192 (PCT/US2006/010648), mailed Jun. 15, 2010, 7 pages.

* cited by examiner

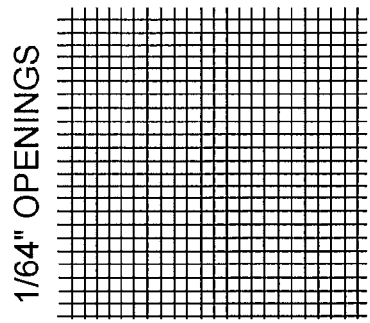
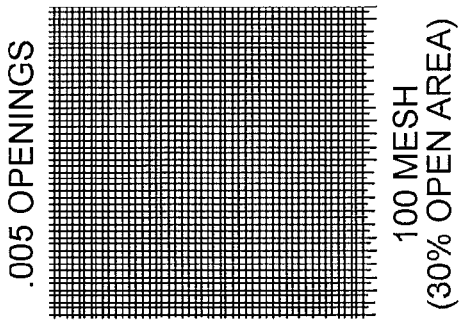
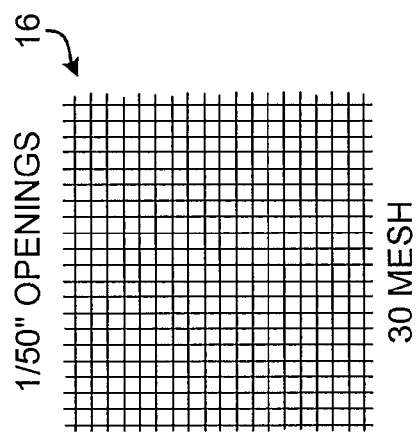
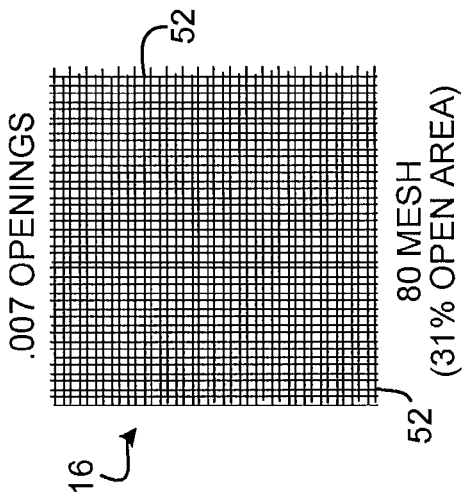
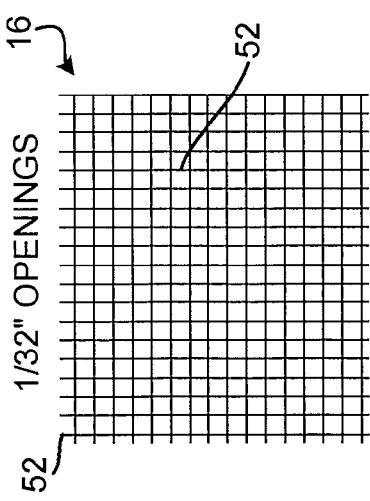
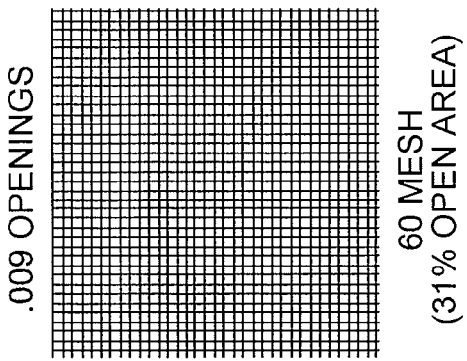

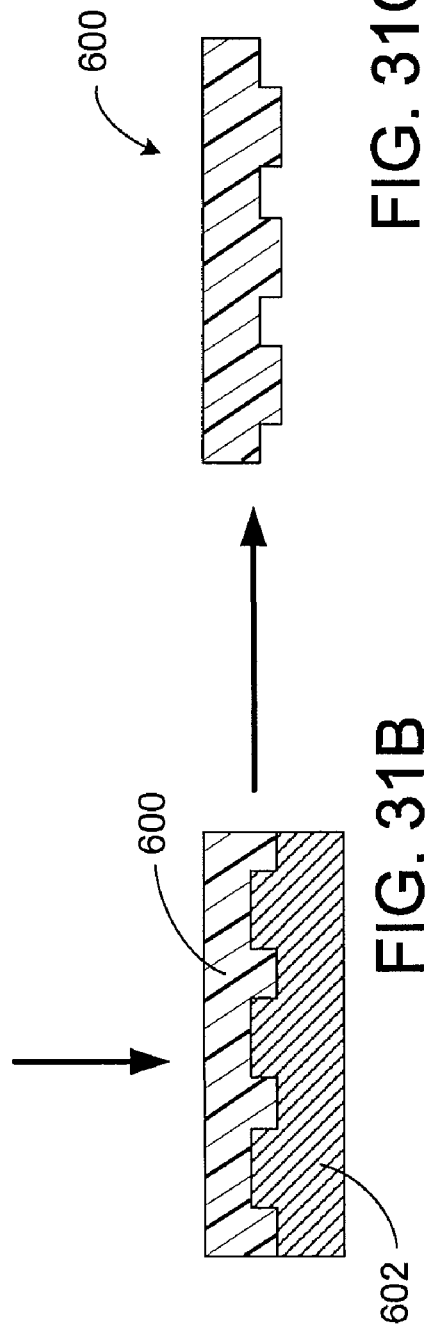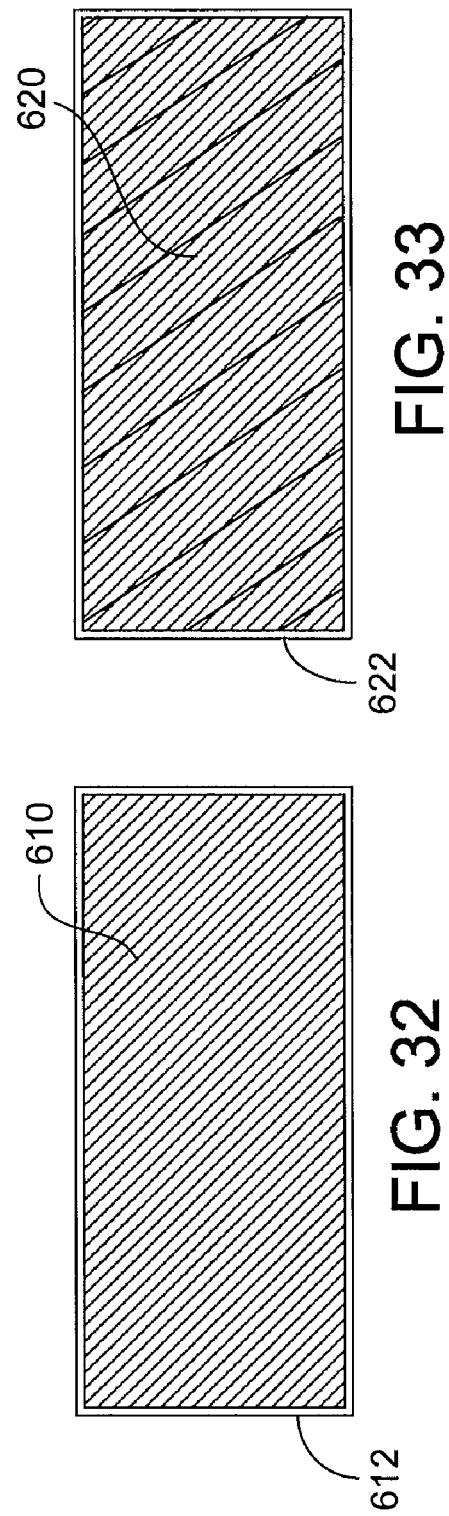

FIBROUS MATERIALS AND COMPOSITES

CROSS REFERENCE TO RELATED APPLICATIONS

This application claims priority from International Application No. PCT/US2006/010648, filed Mar. 23, 2006, which claims priority from U.S. Provisional Patent Application Nos. 60/664,832, filed on Mar. 24, 2005; 60/688,002, filed on Jun. 7, 2005; 60/711,057, filed on Aug. 24, 2005; 60/715,822, filed on Sep. 9, 2005; 60/725,674, filed on Oct. 12, 2005; 60/726,102, filed on Oct. 12, 2005; and 60/750,205, filed on Dec. 13, 2005. The entire contents of each application of this paragraph is hereby incorporated by reference herein in its entirety.

TECHNICAL FIELD

This invention relates to fibrous materials and composites, and to methods of making the same.

BACKGROUND

Fibrous materials, e.g., cellulosic and lignocellulosic materials, are produced, processed, and used in large quantities in a number of applications. Often such fibrous materials are used once, and then discarded as waste.

SUMMARY

Generally, the invention relates to fibrous materials and composites, and to methods of making the same.

Generally, a first aspect of the invention features fibrous materials and methods of making fibrous materials.

Methods of making fibrous materials are disclosed that include shearing a fiber source to provide a first fibrous material, and passing the first fibrous material through a first screen having an average opening size of 1.59 mm or less (1/16 inch, 0.0625 inch) to provide a second fibrous material.

In some embodiments, the average opening size of the first screen is less than about 0.79 mm (1/32 inch, 0.03125 inch), e.g., less than about 0.40 mm (1/64 inch, 0.015625 inch), less than about 0.20 mm (1/128 inch, 0.0078125 inch), or even less than about 0.10 mm (1/256 inch, 0.00390625 inch).

In specific implementations, the shearing is performed with a rotary knife cutter.

The second fibrous material can, e.g., be collected in a bin having a pressure below nominal atmospheric pressure, e.g., at least 10 percent below nominal atmospheric pressure or at least 75 percent below nominal atmospheric pressure.

The second fibrous material can, e.g., be sheared once or numerous times, e.g., twice, thrice, or even more, e.g., ten times.

The second fibrous material can, e.g., be sheared and the resulting fibrous material passed through the first screen.

The second fibrous material can be sheared, and the resulting fibrous material passed through a second screen having an average opening size less than the first screen, providing a third fibrous material.

A ratio of an average length-to-diameter ratio of the second fibrous material to an average length-to-diameter ratio of the third fibrous material can be, e.g., less than about 1.5, less than about 1.4, less than about 1.25, or even less than about 1.1.

The second fibrous can, e.g., be passed through a second screen having an average opening size less than the first screen.

The shearing and passing can, e.g., be performed concurrently.

The second fibrous material can have an average length-to-diameter ratio of, e.g., greater than about 10/1, greater than about 25/1, or even greater than about 50/1.

An average length of the second fibrous material can be, e.g., between about 0.5 mm and about 2.5 mm, e.g., between about 0.75 mm and about 1.0 mm. An average width of the second fibrous material can be, e.g., between about 5 μm and about 50 μm, e.g., between about 10 μm and about 30 μm.

A standard deviation of a length of the second fibrous material can be less than about 60 percent of an average length of the second fibrous material, e.g., less than about 50 percent of an average length of the second fibrous material.

In some embodiments, a BET surface area of the second fibrous material is greater than about 0.5 m$^2$/g, e.g., greater than about 1.0 m$^2$/g, greater than about 1.5 m$^2$/g, greater than about 1.75 m$^2$/g, or even greater than about 0.5 m$^2$/g.

In some embodiments, a porosity of the second fibrous material is greater than about 70 percent, e.g., greater than about 85 percent, or greater than about 90 percent.

In some implementations, a ratio of an average length-to-diameter ratio of the first fibrous material to an average length-to-diameter ratio of the second fibrous material is less than about 1.5, e.g., less than about 1.4, less than about 1.25, or less than about 1.1.

In specific embodiments, the screen is formed by interweaving mono-filaments.

The fiber source can include, e.g., a cellulosic material, a lignocellulosic material. For example, the fiber source can be sawdust.

In some embodiments, the fiber source includes a blend of fibers, e.g., fibers derived from a paper source and fibers derived from a textile source, e.g., cotton.

Methods of making fibrous materials are also disclosed that include shearing a fiber source to provide a first fibrous material; and passing the fibrous material through a first screen to provide a second fibrous material. A ratio of an average length-to-diameter ratio of the first fibrous material to an average length-to-diameter of the second fibrous material is less than about 1.5.

Methods of making fibrous materials are also disclosed that include shearing a fiber source to provide a first fibrous material; passing the fibrous material through a first screen to provide a second fibrous material; and then shearing the second fibrous material again to provide a third fibrous material.

Fibrous materials are disclosed that have an average length-to-diameter ratio of greater than about 5, and having a standard deviation of a fiber length of less than about sixty percent of an average fiber length.

For example, the average length-to-diameter ratio can be greater than about 10/1, e.g., greater than about 15/1, greater than about 25/1, greater than about 35/1, greater than about 45/1, or even greater than about 50/1.

For example, the average length can be between about 0.5 mm and about 2.5 mm.

Methods of making fibrous materials are disclosed that include shearing a fiber source to provide a first fibrous material; collecting the first fibrous material; and then shearing the first fibrous to provide a second fibrous material.

Composites are disclosed that includes a fibrous material, a resin and a dye. For example, the dye can aid in the masking of the fibrous material in the composite.

For example, the fibrous material can have an average length-to-diameter ratio of greater than about 5, and a standard deviation of a fiber length of less than about sixty percent of an average fiber length.

In some embodiments, the composite additionally includes a pigment.

In some implementations, the dye is soaked into or surfaced on the fibers.

The composites can include a scent or a fragrance.

Methods of making composites are also disclosed that include dyeing a fibrous material; combining the fibrous material with a resin; and forming a composite from the combination.

Methods of making composites are disclosed that include adding a dye to a resin to provide a dye/resin combination; combining the dye/resin combination with a fibrous material; and forming a composite from the dye/resin combination and fibrous material.

Any composite can be, e.g., in the form of a stepping stool, pipes, panels, decking materials, boards, housings, sheets, blocks, bricks, poles, fencing, members, doors, shutters, awnings, shades, signs, frames, window casings, backboards, flooring, tiles, railroad ties, trays, tool handles, stalls, films, wraps, tapes, boxes, baskets, racks, casings, binders, dividers, walls, mats, frames, bookcases, sculptures, chairs, tables, desks, toys, games, pallets, wharves, piers, boats, masts, septic tanks, automotive panels, computer housings, above- and below-ground electrical casings, furniture, picnic tables, benches, shelters, trays, hangers, servers, caskets, book covers, canes and crutches.

The first aspect and/or embodiments of the first aspect can have any one of, or combinations of, the following advantages. The fibrous materials are easy to disperse, e.g., in a molten thermoplastic resin. The fibrous materials can have, e.g., a relatively narrow length and/or length-to-diameter ratio distribution, such that their properties are consistently defined. For example, when blended with a molten resin, the fibers of the fibrous materials can modify the rheology of the molten resin in a consistent and predicable manner, resulting in resin/fibrous material combinations that are, e.g., easier to mold and extrude. For example, the fibrous materials can easily pass through small openings or channels, such as those found in or associated with injection molds, e.g., gates or hot runners. Parts molded from such fibrous materials can exhibit a good surface finish, e.g., with few visible speckles of large particles and/or agglomerated particles, when that is desired.

Generally, a second aspect of the invention features densified fibrous materials, methods of making the densified fibrous materials, and composites made from the densified fibrous materials.

Methods of densifying fibrous materials are disclosed that include adding, to a fibrous material, a water soluble binder, a water swellable binder, and/or a binder having a glass transition temperature of less than about 25° C., to provide a fibrous material-binder combination. The fibrous material-binder combination is densified to provide a densified fibrous material having a bulk density that is at least about two times greater than the bulk density of the fibrous material, e.g., three times, four times, five times, six times, eight times, ten times, twelve times, twenty times or more, e.g., forty times greater. Preferably, the bulk density of the densified material is at least about three times or about four times greater than the bulk density of the fibrous material.

Methods of densifying fibrous materials are also disclosed that include densifying a fibrous material derived at least in part from polycoated paper to provide a densified fibrous material having a bulk density that is at least about two times greater than the bulk density of the fibrous material, e.g., three times, four times, five times, six times, eight times, ten times, twelve times, twenty times or more, e.g., forty times greater. Densifying includes heating the fibrous material to a temperature of at least about 50° C.

Methods of densifying fibrous materials are disclosed include moving a fibrous material past a binder application area at which a binder is applied to provide a fibrous material-binder combination. The fibrous material-binder combination is densified to provide a densified fibrous material having a bulk density of at least about two times the bulk density of the fibrous material, e.g., three times, four times, five times, six times, eight times, ten times, twelve times, twenty times or more, e.g., forty times greater.

Methods of densifying fibrous materials are disclosed that include evacuating air from a fibrous material to increase the bulk density of the fibrous material at least about two times. For example, the method can include sealing the fibrous material in a container and evacuating air from the container.

Pellets or chips are disclosed that include a densified fibrous material. The pellets or chips have a bulk density of at least 0.3 g/cm$^3$. The densified fibrous material includes a cellulosic or lignocellulosic material and a water soluble binder, a water swellable binder, and/or binders having a glass transition temperature of less than about 25° C. The pellets or chips have, e.g., an average thickness between about 2 mm and about 20 mm, an average width of between about 2 mm and about 40 mm and an average length of between about 5 mm and about 40 mm. In some embodiments, the pellets define a hollow inner portion, or a multi-lobal structure.

Plate-like densified fibrous materials are disclosed which have a bulk density of at least 0.3 g/cm$^3$. The densified fibrous materials includes a cellulosic or lignocellulosic material. The plate like densified fibrous materials have, e.g., an average thickness between about 2 mm and about 20 mm, an average width of between about 2 mm and about 40 mm and an average length of between about 5 mm and about 40 mm.

Methods of densifying fibrous materials are also disclosed that include adding, to a fibrous material, a water soluble binder, a water swellable binder and/or a binders having a glass transition temperature of less than about 25° C., to provide a fibrous material-binder combination. The fibrous-binder combination includes less than about 25 weight percent binder, e.g., 15 weight percent, 10 weight percent, 5 weight percent or less than about 1 weight percent. The fibrous material-binder combination is densified to provide a densified fibrous material having a bulk density that is at least about two times greater than the bulk density of the fibrous material, e.g., three times, four times, five times, six times, eight times, ten times, twelve times, twenty times or more, e.g., about forty times greater.

Methods of compressing fibrous materials are disclosed that feature positioning a fibrous material including a binder with respect to a member, e.g., between a first member and a second member, to provide an uncompressed composite, and compressing the uncompressed composite to provide a compressed composite.

In some embodiments, the compressing is performed using a single member and a support.

Any densified fibrous material can be used to form any article disclosed herein.

The densified fibrous materials can include a scent or a fragrance.

The densified fibrous materials can, e.g., be used to make composites, or they can be used as themselves or along with additives, e.g., as controlled release matrices.

Methods of densifying fibrous materials, e.g., a cellulosic or lignocellulosic material, are also disclosed that do not utilize a binder.

Pellets or chips of densified fibrous materials are disclosed that have a bulk density of at least about 0.3 g/cm$^3$. The densified fibrous materials include a fibrous material other than a cellulosic or cellulosic material and a binder. The pellets or chips have an average thickness between about 2 mm and about 20 mm, an average width of between about 2 mm and about 40 mm and an average length of between about 5 mm and about 40 mm.

Plate-like densified fibrous materials are disclosed that have a bulk density of at least about 0.3 g/cm$^3$. The densified fibrous materials include a fibrous material other than a cellulosic or lignocellulosic material and a binder. The plate-like densified fibrous materials have an average thickness between about 2 mm and about 20 mm, an average width of between about 2 mm and about 40 mm and an average length of between about 5 mm and about 40 mm.

The second aspect and/or embodiments of the second aspect can have any one of, or combinations of, the following advantages. The densified fibrous materials, e.g., in pellet or chip form, are easier to handle, feed into machinery, transport, and mix with other materials, e.g., resins, e.g., thermoplastic resin.

Generally, a third aspect of the invention features crosslinked composites, and composites that include nanometer scale fillers. The composites that include the nanometer scale fillers are optionally crosslinked when this is desired.

Methods of making composites are disclosed that include combining a fibrous material with a radiation cross-linkable resin, e.g., a thermoplastic resin, to provide a fibrous material/cross-linkable resin combination. The fibrous material has an average length-to-diameter ratio of greater than about 5, and a standard deviation of a fiber length is less than about eighty five percent of an average fiber length. The fibrous material/cross-linkable resin is irradiated, e.g., with an ionizing radiation, to at least partially cross-link the cross-linkable resin. In some embodiments, prior to the step of irradiating, the fibrous material/crosslinkable resin combination is formed into a desired shape.

The radiation cross-linkable resin can be, e.g., a thermoplastic or a thermoset, e.g., a cast thermoset. For example, the radiation cross-linkable resin can be a polyolefin, e.g., a polyethylene (e.g., a copolymer of polyethylene), a polypropylene (e.g., a copolymer of polypropylene), a polyester (e.g., polyethylene terephthalate), a polyamide (e.g., nylon 6, 6/12 or 6/10), a polyethyleneimine, elastomeric styrenic copolymers (e.g., styrene-ethylene-butylene-styrene copolymers), a polyamide elastomer (e.g., polyether-polyamide copolymer), ethylene-vinyl acetate copolymer, or compatible mixtures of these resins.

In some specific embodiments, the resin is a polyolefin that has a polydispersity of greater than about 2, e.g., greater than about 3, greater than about 3.5, greater than about 4.0, greater than about 4.5, greater than about 5.0, greater than about 7.5 or even greater than about 10. A high polydispersity can improve impact resistance in the cross-linked composite. In some embodiments, the polyolefin has a melt flow rate greater than about 10, e.g., greater than 15, greater than 20, greater than 25, greater than 30, or even greater than about 50. A high melt flow can aid in the production of the composite, e.g., by reducing shear heating during the forming of the composite.

In specific embodiments, the fibrous material is provided by shearing a fiber source, e.g., sawdust from milling a hard or soft wood (e.g., oak, cedar or redwood).

The average length-to-diameter ratio of the fibers of the fibrous materials can be, e.g., greater than about 10/1, e.g., greater than 15/1, greater than 25/1, or even greater than about 50/1. A high L/D can improve the mechanical properties, e.g.,
tensile strength and flexural modulus of the composite. In some embodiments, the standard deviation of the fiber length is less than about seventy-five percent of the average fiber length, e.g., less than fifty percent, less than 35 percent, less than 25 percent, less than 15 percent, less than 10 percent, less than 5 percent, or even less than about 2.5 percent. A low standard deviation can, e.g., improve processability of the fibrous material/resin blend. An average length of the fibrous material can be, e.g., between about 0.5 mm and about 2.5 mm, e.g., between about 0.75 mm and about 1.0 mm. An average width of the fibrous material is between about 5 μm and about 50 μm, e.g., between about 10 μm and about 30 μm.

The fibrous material can be, e.g., derived from a textile, e.g., cotton scraps or remnants, a paper source, a plant or a tree. In some embodiments, the fibrous material includes a blend of fibers, e.g., fibers derived from a paper source and fibers derived from a textile source, e.g., cotton.

In specific embodiments, the irradiating of the fibrous material/cross-linkable resin combination is performed with gamma rays or a beam of electrons.

In some embodiments, the composite is in the form of a structure, ornamental goods and articles, a stepping stool, pipes, panels, decking materials, boards, housings, sheets, blocks, bricks, poles, fencing, members, doors, shutters, awnings, shades, signs, frames, window casings, backboards, flooring, tiles, railroad ties, trays, tool handles, stalls, films, wraps, tapes, boxes, baskets, racks, casings, binders, dividers, walls, mats, frames, bookcases, sculptures, chairs, tables, desks, toys, games, pallets, wharves, piers, boats, masts, septic tanks, automotive panels, computer housings, above- and below-ground electrical casings, furniture, picnic tables, benches, shelters, trays, hangers, servers, caskets, book covers, canes and crutches.

In some embodiments, the fibrous material is prepared by shearing a fiber source to provide a first fibrous material, and passing the first fibrous material through a first screen having an average opening size of about 1.59 mm or less (1/16 inch, 0.0625 inch) to provide a second material. In some embodiments, the average opening size of the first screen is less than 0.79 mm (1/32 inch, 0.03125 inch), e.g., less than about 0.40 mm (1/64 inch, 0.015625 inch).

In some embodiments, the irradiating is performed with electromagnetic radiation that has an energy per photon (in electron volts) of greater than about 10$^2$ eV/photon, e.g., greater than 10$^3$, 10$^4$, 10$^5$, 10$^6$, or even greater than about 10$^7$ eV/photon. In some embodiments, the electromagnetic radiation has energy per photon of between about 10$^4$ and about 10$^7$, e.g., between about 10$^5$ and about 10$^6$ eV/photon.

In some embodiments, the irradiating is performed with electromagnetic radiation that has a frequency of greater than about 10$^{16}$ hz, greater than about 10$^{17}$ hz, 10$^{18}$, 10$^{19}$, 10$^{20}$, or even greater than about 10$^{21}$ hz. In some embodiments, the electromagnetic radiation has a frequency of between about 10$^{18}$ and about 10$^{22}$, e.g., between about 10$^{19}$ to about 10$^{21}$ hz.

In some embodiments, the irradiating is performed until the fibrous material/cross-linkable resin combination receives a dose of at least about 0.25 Mrad, e.g., at least 1.0 Mrad, at least 2.5 Mrad, at least 5.0 Mrad, or at least about 10 Mrad. In some embodiments, the irradiating is performed until the fibrous material/cross-linkable resin combination receives a dose of between about 1.0 Mrad and about 6.0 Mrad, e.g., between about 1.5 Mrad and about 4.0 Mrad.

In some embodiments, the irradiating is performed at a dose rate of between 5 about 5 and about 1500 kilorads/hour, e.g., between about 10 and about 750 kilorads/hour or between about 50 and about 350 kilorads/hours.

In some embodiments, the irradiating is performed with electromagnetic radiation generated from a $^{60}$Co source.

Composites are disclosed that include a cross-linked resin and a fibrous material having an average length-to-diameter ratio of greater than about 5 and a standard deviation of a fiber length is less than about eighty five percent of an average fiber length.

In some embodiments, the average length-to-diameter ratio is greater than about 10/1, e.g., greater than about 15/1, greater than about 25/1, or even greater than 5 about 0/1.

In some embodiments, the standard deviation the fiber length is less than about seventy-five percent of the average fiber length, e.g., less than fifty percent, less than 35 percent, less than 25 percent, less than 15 percent, less than 10 percent, less than 5 percent, or even less than about 2.5 percent. In some embodiments, an average length of the fibrous material is between about 5 mm and about 2.5 mm, e.g., between about 5 µm and about 50 µm.

Methods of making composites also are disclosed that include shearing a fiber source to provide a fibrous material; combining the fibrous material with a cross-linkable resin to provide a fibrous material/resin combination; and irradiating with gamma radiation to at least partially crosslink the cross-linkable resin.

In some embodiments, the shearing is performed with a rotary knife cutter.

Methods of making composites are disclosed that include combining a fibrous material with a radiation cross-linkable resin to provide a fibrous material/cross-linkable resin combination. The fibrous material has an average length-to-diameter ratio of greater than about 5, and a standard deviation of a fiber length is less than about eighty five percent of an average fiber length. The fibrous material/cross-linkable resin is formed into a desired shape and irradiated to at least partially cross-link the cross-linkable resin.

Methods of making composites are disclosed that include combining a filler, e.g., a fibrous material, with a radiation cross-linkable resin to provide a filler/cross-linkable resin combination and irradiating the filler/cross-linkable resin combination to at least partially cross-link the cross-linkable resin.

Methods of reducing biological overgrowth, e.g., of yeasts and/or bacteria, in composites are disclosed that include irradiating a composite with an ionizing radiation prior to use. In some embodiments, the composite is in the form of a board, e.g., decking material.

Composites are disclosed that include a resin, a filler having a transverse dimension of less than about 1000 nm, and a fibrous material. In some implementations, the transverse dimension is less than 500 nm.

In some embodiments, the resin is cross-linked, e.g., using a chemical cross-linking agent or radiation.

In some embodiments, the fibrous material includes a cellulosic or lignocellulosic material.

In specific embodiments, the fibrous material has an average length-to-diameter ratio of greater than about 5 and a standard deviation of a fiber length is less than about eighty five percent of an average fiber length.

Methods of making composites are disclosed that include combining a filler having a transverse dimension of less than about 1000 nm and a fibrous material with a resin. The methods may further include forming the combination of the filler/fibrous material/resin into a desired shape. The desired shape can be, e.g., irradiated to at least partially cross-link the resin.

Methods of making composites are disclosed that include combining a filler having a transverse dimension of less than about 1000 nm and a fibrous material with a radiation cross-linkable resin to provide a filler/fibrous material/cross-linkable resin combination; and irradiating the filler/fibrous material/cross-linkable resin combination to at least partially cross-link the cross-linkable resin.

Composites are also disclosed that include a resin and sawdust having fibers having an average length-to-diameter ratio of greater than about 5 and a standard deviation of a fiber length is less than about eighty five percent of an average fiber length dispersed therein. In some embodiments, the sawdust is derived from a hard wood, e.g., oak, or from a soft wood, e.g., cedar, redwood or pine.

Methods of making composites are also disclosed that include shearing sawdust to provide a fibrous material, and combining the fibrous material with a resin to provide a fibrous material/resin combination. In some embodiments, the methods may further include irradiating the fibrous material/resin combination with gamma radiation to at least partially crosslink the resin.

The third aspect and/or embodiments of the third aspect can have any one of, or combinations of, the following advantages. The composites can have excellent mechanical properties, e.g., abrasion resistance, compression strength, fracture resistance, impact strength, bending strength, tensile modulus, flexural modulus and elongation at break. The composites can have excellent low temperature performance, e.g., having a reduced tendency to break and/or crack at low temperatures, e.g., temperatures below 0° C., e.g., below −110° C., −20° C., −40° C., −50° C., −60° C. or even below −100° C. In addition, the composites can have excellent performance at high temperatures, e.g., maintain their advantageous mechanical properties at relatively high temperature, e.g., at temperatures above 100° C., e.g., above 125° C., 150° C., 200° C., 250° C., 300° C., 400° C., or even above 500° C. The composites can have excellent chemical resistance, e.g., resistance to swelling in a solvent, e.g., a hydrocarbon solvent, resistance to chemical attack, e.g., by strong acids, strong bases, strong oxidants (e.g., chlorine or bleach) or reducing agents (e.g., active metals such as sodium and potassium). The composites can have a reduced tendency rot and decay since treatment of the composites with radiation tends to kill any microbes, e.g., fungus, bacteria or insects.

Generally, a fourth aspect of the invention features fragranced composites, and methods of making the same. The fragranced composites can be crosslinked if this is desired.

Fiber sources, fibrous materials or densified fibrous materials are disclosed in combination with a fragrance. Examples of fragrances include cedarwood, evergreen or redwood. In some embodiments, the fiber source, the fibrous material or the densified fibrous material in combination with the fragrance includes a colorant and/or a biocide. In some embodiments, the fragrance includes a tree fragrance, e.g., natural redwood fragrance, and the color, e.g., red, matches the tree from which the fragrance is derived.

Fiber sources, fibrous materials or densified fibrous materials are also disclosed in combination with a fragrance and a resin, e.g., a thermoplastic resin. In some embodiments, a colorant and/or a biocide is also utilized. In some embodiments, the fragrance includes a tree fragrance, e.g., natural redwood fragrance, and the color, e.g., red, matches the tree from which the fragrance is derived.

Methods of making composites are disclosed that include adding to a fibrous material to a fragrance to provide a fibrous material-fragrance combination, and compressing the fibrous material-fragrance combination to provide a composite. The fragrance can be, e.g., in a resin that is added to the fibrous material.

Composite are also disclosed that include a fibrous material and a fragrance. In some embodiments, the composites also includes a resin, e.g., a thermoplastic or thermoset resin. The fibers of the fibrous material can have, e.g., a length-to-diameter ratio of greater than about 5, e.g., greater than 10, greater than 25, greater than 50 or greater than about 100.

The fourth aspect and/or embodiments of the fourth aspect can have any one of, or combinations of, the following advantages. The disclosed scented composites, e.g., densified fibrous materials and wood-substitute composites, can stir interest at a point of purchase, and can allow for unusual branding and marketing opportunities.

Generally, a fifth aspect of the invention features composites that have unique, pleasing or even striking visual properties, and methods of making the same.

Composite are disclosed that include a resin and a fibrous material, and that have an external surface. Some of the fibrous material is visible.

The fibrous material can be visible on the external surface, in the external surface, or under the external surface, e.g., under the surface a distance of less than about 0.100 inch, e.g., less than 0.050 inch, less than 0.025 inch, less than 0.010 inch or less than about 0.005 inch.

Composite are also disclosed that include a transparent resin, e.g., transparent nylon or clarified polypropylene, and a fibrous material.

Method of making composites are also disclosed that include combining a resin and a fibrous material to provide a resin/fibrous material combination; and compressing the resin/fibrous material combination to provide a composite having an external surface in which some of the fibrous material is visible.

Methods of making composites are disclosed that include combining a transparent resin and a fibrous material to provide a transparent resin/fibrous material combination; and compressing the transparent resin/fibrous material combination to provide a composite.

The fifth aspect and/or embodiments of the fifth aspect can have any one of, or combinations of, the following advantages. The composites can have unique, pleasing or even striking visual properties, and at the same time can have desirable mechanical properties, e.g., high abrasion resistance, high compression strength, fracture resistance, high impact strength, high bending strength, high tensile modulus, high flexural modulus and high elongation at break. Such composites can, e.g., enhance brand name recognition and brand name loyalty.

The term "fibrous material", as used herein, is a material that includes numerous loose, discrete and separable fibers. For example, a fibrous material can be prepared from a polycoated paper or a bleached Kraft paper fiber source by shearing, e.g., with a rotary knife cutter.

The term "screen", as used herein, means a member capable of sieving material according to size, e.g., a perforated plate, cylinder or the like, or a wire mesh or cloth fabric.

A nanometer scale filler is one that has a transverse dimension of less than about 1000 nm. The transverse dimension of a nanometer scale filler is its diameter if it is a spherical particle or a relatively long thin fiber, or a maximum size of an irregularly shaped particle.

A fibrous material is visible on or in a composite if the fibrous material can be seen by a human being of average vision under daylight conditions when the composite is held a distance of three feet from the human.

All publications, patent applications, patents, and other references mentioned herein are incorporated by reference herein in their entirety.

Other features and advantages of the invention will be apparent from the following detailed description, and from the claims.

DESCRIPTION OF DRAWINGS

FIGS. 3-8 are top views of a variety of screens made from monofilaments.

FIG. 10A being a photograph of a polycoated paper container, and FIG. 10B being a photograph of unbleached Kraft paper rolls.

FIG. 25A is an enlarged view of area 25A of FIG. 25.

FIGS. 31A, 31B and 31C schematically illustrate making a composite from a mold having a mold surface.

FIG. 32 is a cross-sectional view of resin/fibrous material composite having an inner portion that has substantially no fibrous material and an outer portion surrounding the inner portion that includes fibrous material.

FIG. 33 is a cross-sectional view of a transparent resin/fibrous material composite having an inner portion that has substantially all of the fibrous material and an outer portion having substantially no fibrous material surrounding the inner portion.

DETAILED DESCRIPTION

Generally, fibrous materials, densified fibrous materials and composites made from these materials and combinations of these materials are disclosed.

Some of the fibrous materials disclosed herein are easy to disperse in a resin, such as a thermoplastic resin, and can advantageously modify the rheology of the resin in a consistent and predicable manner, resulting in resin/fibrous material combinations that can be, e.g., easier to mold and extrude. Many of the densified fibrous materials disclosed herein, such as those in pellet or chip form, can be easier to handle, feed into machinery, transport, and mix with other materials. Many of the composites disclosed herein have excellent mechanical properties, such as abrasion resistance, compression strength, fracture resistance, impact strength, bending strength, tensile modulus, flexural modulus and elongation at break. Many of the composites, and especially many of the crosslinked composites, have a reduced tendency to break and/or crack at low temperatures and have enhanced high temperature stability and chemical resistance. Some of the scented composites, such as wood-substitute composites, can stir interest at a point of purchase, and can allow for unusual branding and marketing opportunities. Many disclosed composites have unique, pleasing or even striking visual properties.

Fibrous Materials

Generally, fibrous materials are derived from one or more fiber sources, e.g., by shearing a fiber source to release fibrous material.

Figure 1:
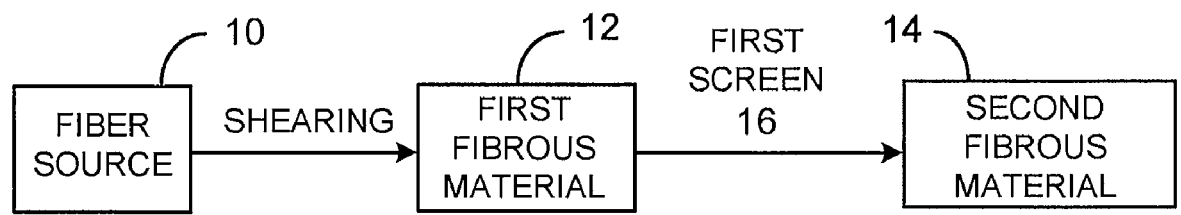
FIG. 1 is block diagram illustrating conversion of a fiber source into a first and second fibrous material.

Referring to FIG. 1, a fiber source 10 is sheared, e.g., in a rotary knife cutter, to provide a first fibrous material 12. This fibrous material can be used as provided, e.g., to make densified fibrous materials and/or composites, or the first fibrous material 12 can be passed through a first screen 16 having an average opening size of 1.59 mm or less (1/16 inch, 0.0625 inch) to provide a second fibrous material 14. If desired, fiber source 10 can be cut prior to the shearing, e.g., with a shredder. For example, when a paper is used as the fiber source 10, the paper can be first cut into strips that are, e.g., ¼- to ½-inch wide, using a shredder, e.g., a counter-rotating screw shredder, such as those manufactured by Munson (Utica, N.Y.).

In some embodiments, the shearing of fiber source 10 and the passing of the resulting first fibrous material 12 through first screen 16 are performed concurrently. The shearing and the passing can also be performed in a batch-type process.

Figure 2:
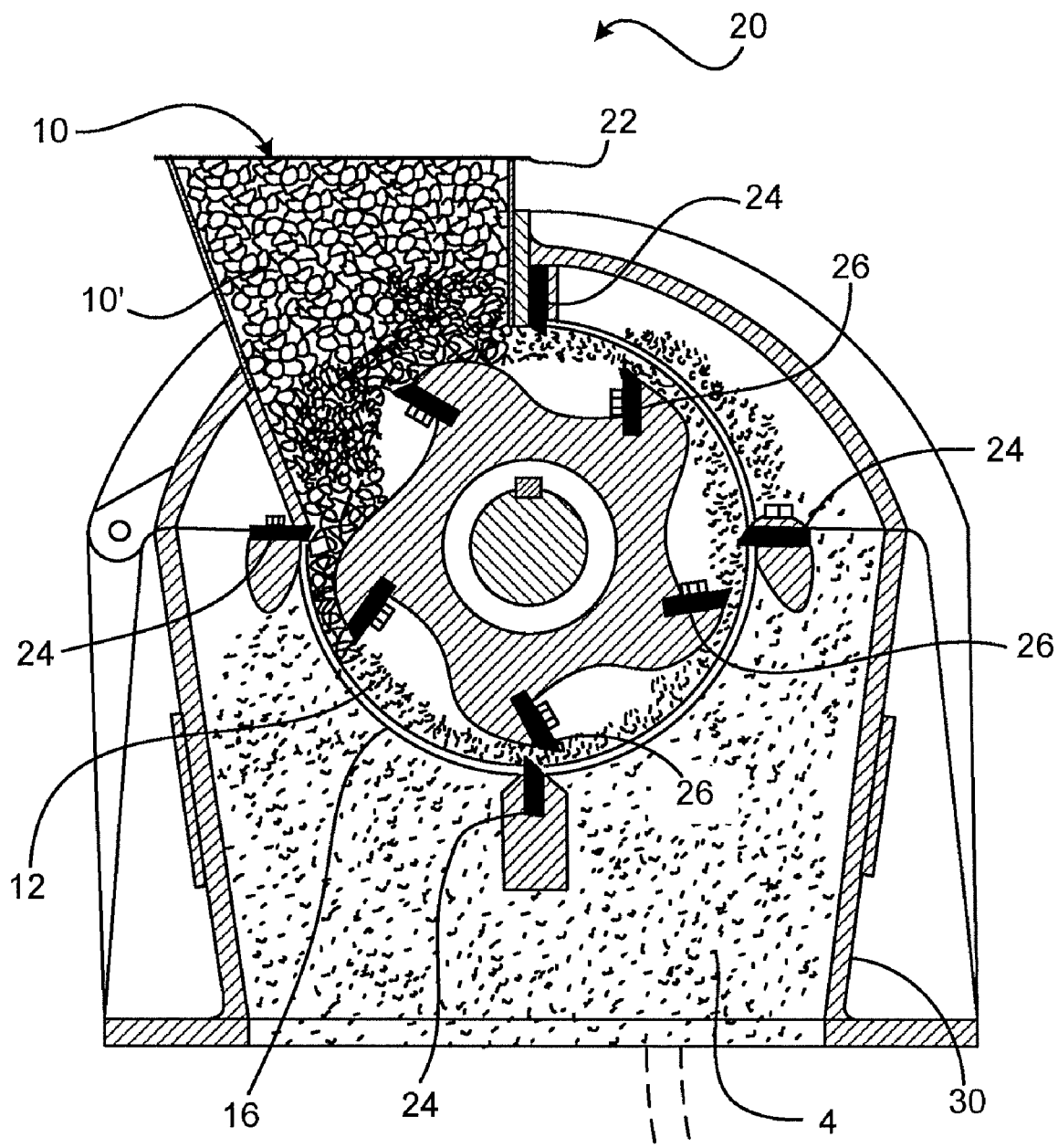
FIG. 2 is a cross-sectional view of a rotary knife cutter.

For example, a rotary knife cutter can be used to concurrently shear the fiber source 10 and screen the first fibrous material 12. Referring to FIG. 2, a rotary knife cutter 20 includes a hopper 22 that can be loaded with a shredded fiber source 10' prepared by shredding fiber source 10. Shredded fiber source 10' is sheared between stationary blades 24 and rotating blades 26 to provide a first fibrous material 12. First fibrous material 12 passes through screen 16 having the dimensions described above, and the resulting second fibrous material 14 is captured in bin 30. To aid in the collection of the second fibrous material 14, bin 30 can have a pressure below nominal atmospheric pressure, e.g., at least 10 percent below nominal atmospheric pressure, e.g., at least 25 percent below nominal atmospheric pressure, at least 50 percent below nominal atmospheric pressure, or at least 75 percent below nominal atmospheric pressure. In some embodiments, a vacuum source 50 is utilized to maintain the bin below nominal atmospheric pressure.

Referring to FIGS. 3-8, in some embodiments, the average opening size of the first screen 16 is less than 0.79 mm (1/32 inch, 0.03125 inch), e.g., less than 0.51 mm (1/50 inch, 0.02000 inch), less than 0.40 mm (1/64 inch, 0.015625 inch), less than 0.23 mm (0.009 inch), less than 0.20 mm (1/128 inch, 0.0078125 inch), less than 0.18 mm (0.007 inch), less than 0.13 mm (0.005 inch), or even less than less than 0.10 mm (1/256 inch, 0.00390625 inch). Screen 16 is prepared by interweaving monofilaments 52 having an appropriate diameter to give the desired opening size. For example, the monofilaments can be made of a metal, e.g., stainless steel. As the opening sizes get smaller, structural demands on the monofilaments may become greater. For example, for opening sizes less than 0.40 mm, it can be advantageous to make the screens from monofilaments made from a material other than stainless steel, e.g., titanium, titanium alloys, amorphous metals, nickel, tungsten, rhodium, rhenium, ceramics, or glass. In some embodiments, the screen is made from a plate, e.g. a metal plate, having apertures, e.g., cut into the plate using a laser.

In some embodiments, the second fibrous 14 is sheared and passed through the first screen 16, or a different sized screen. In some embodiments, the second fibrous material 14 is passed through a second screen having an average opening size equal to or less than that of first screen 16.

Figure 9:
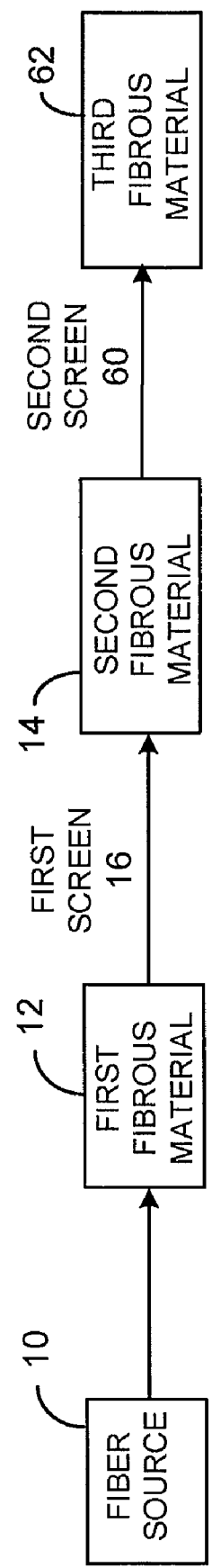
FIG. 9 is block diagram illustrating conversion of a fiber source into a first, second and third fibrous material.

Referring to FIG. 9, a third fibrous material 62 can be prepared from the second fibrous material 14 by shearing the second fibrous material 14 and passing the resulting material through a second screen 60 having an average opening size less than the first screen 16.

Figure 10B:
FIGS. 10A and 10B are photographs of fiber sources.
Figure 10A:

Suitable fiber sources include cellulosic fiber sources, including paper and paper products like those shown in FIGS. 10A (polycoated paper) and 10B (Kraft paper), and lignocellulosic fiber sources, including wood, and wood-related materials, e.g., particle board. Other suitable fiber sources include natural fiber sources, e.g., grasses, rice hulls, bagasse, cotton, jute, hemp, flax, bamboo, sisal, abaca, straw, corn cobs, rice hulls, coconut hair; fiber sources high in α-cellulose content, e.g., cotton; synthetic fiber sources, e.g., extruded yarn (oriented yarn or un-oriented yarn) or carbon fiber sources; inorganic fiber sources; and metal fiber sources. Natural or synthetic fiber sources can be obtained from virgin scrap textile materials, e.g., remnants or they can be post consumer waste, e.g., rags. When paper products are used as fiber sources, they can be virgin materials, e.g., scrap virgin materials, or they can be post-consumer waste. Additional fiber sources have been described in U.S. Pat. Nos. 6,448,307, 6,258,876, 6,207,729, 5,973,035 and 5,952,105.

In specific embodiments, the fiber source includes sawdust, e.g., from milling, machining or sanding hard or soft woods. Examples of hard woods include oak, maple, cherry (e.g., Brazilian cherry), walnut, mahogany, cypress or rose-wood. Examples of soft woods include cedar (e.g., red and white cedar), pine, spruce, fir (e.g., Douglas fir) and redwood. In some embodiments it is advantageous to use a fragrant wood, such as cedar or redwood, because it can impart a fragrance to the composite. In some embodiments, fragrance is added to the sawdust. In some embodiments, it is advantageous to shear the sawdust, e.g., using a rotary knife cutter, to de-agglomerate the sawdust.

Blends of any of the above fiber sources or fibrous materials can be utilized, e.g., to make composites or densified fibrous materials.

Generally, the fibers of the fibrous materials can have a relatively large average length-to-diameter ratio (e.g., greater than 20-to-1), even if they have been sheared more than once. In addition, the fibers of the fibrous materials described herein may have a relatively narrow length and/or length-to-diameter ratio distribution. Without wishing to be bound by any particular theory, it is currently believed that the relatively large average length-to-diameter ratio and the relatively narrow length and/or length-to-diameter ratio distribution are, at least in part, responsible for the ease at which the fibrous materials are dispersed in a resin, e.g., a molten thermoplastic resin. It is also believed that the relatively large average length-to-diameter ratio and the relatively narrow length and/or length-to-diameter ratio distribution are, at least in part, responsible for the consistent properties of the fibrous materials, the predictable rheology modification the fibrous materials impart on a resin, the ease at which the combinations of the fibrous materials and resins are cast, extruded and injection molded, the ease in which the fibrous materials pass through small, often torturous channels and openings, and the excellent surface finishes possible with molded parts, e.g., glossy finishes and/or finishes substantially devoid of visible speckles.

As used herein, average fiber widths (i.e., diameters) are those determined optically by randomly selecting approximately 5,000 fibers. Average fiber lengths are corrected length-weighted lengths. BET (Bmauer, Emmet and Teller) surface areas are multi-point surface areas, and porosities are those determined by mercury porosimetry.

The average length-to-diameter ratio of the second fibrous material 14 can be, e.g. greater than 10/1, e.g., greater than 25/1 or greater than 50/1. An average length of the second fibrous material 14 can be, e.g., between about 0.5 mm and 2.5 mm, e.g., between about 0.75 mm and 1.0 mm, and an average width (i.e., diameter) of the second fibrous material 14 can be, e.g., between about 5 µm and 50 µm, e.g., between about 10 µm and 30 µm.

In some embodiments, a standard deviation of the length of the second fibrous material 14 is less than 60 percent of an average length of the second fibrous material 14, e.g., less than 50 percent of the average length, less than 40 percent of the average length, less than 25 percent of the average length, less than 10 percent of the average length, less than 5 percent of the average length, or even less than 1 percent of the average length.

In some embodiments, a BET surface area of the second fibrous material 14 is greater than 0.5 $m^2/g$, e.g., greater than 1.0 $m^2/g$, greater than 1.5 $m^2/g$, greater than 1.75 $m^2/g$ or even greater than 5.0 $m^2/g$. A porosity of the second fibrous material 14 can be, e.g., greater than 70 percent, e.g., greater than 80 percent, greater than 85 percent or greater than 90 percent.

In some embodiments, a ratio of the average length-to-diameter ratio of the first fibrous material 12 to the average length-to-diameter ratio of the second fibrous material 14 is, e.g., less than 1.5, e.g., less than 1.4, less than 1.25, or even less than 1.1.

In particular embodiments, the second fibrous material 14 is sheared again and the resulting fibrous material passed through a second screen having an average opening size less than the first screen to provide a third fibrous material 62. In such instances, a ratio of the average length-to-diameter ratio of the second fibrous material 14 to the average length-to-diameter ratio of the third fibrous material 62 can be, e.g., less than 1.5, e.g., less than 1.4, less than 1.25, or even less than 1.1.

In some embodiments, the third fibrous material 62 is passed through a third screen to produce a fourth fibrous material. The fourth fibrous material can be, e.g., passed through a fourth screen to produce a fifth material. Similar screening processes can be repeated as many times as desired to produce the desired fibrous material having the desired properties.

In some embodiments, the desired fibrous material includes fibers having an average length-to-diameter ratio of greater than 5 and having a standard deviation of the fiber length that is less than sixty percent of the average length. For example, the average length-to-diameter ratio can be greater than 10/1, e.g., greater than 25/1, or greater than 50/1, and the average length can be between about 0.5 mm and 2.5 mm, e.g., between about 0.75 mm and 1.0 nm. An average width of the fibrous material can be between about 5 µm and 50 µm, e.g., between about 10 µm and 30 µm. For example, the standard deviation can be less than 50 percent of the average length, e.g., less than 40 percent, less than 30 percent, less than 25 percent, less than 20 percent, less than 10 percent, less than 5 percent, or even less than 1 percent of the average length. A desirable fibrous material can have, e.g., a BET surface area of greater than 0.5 $m^2/g$, e.g., greater than 1.0 $m^2/g$, greater than 1.5 $m^2/g$, greater than 1.75 $m^2/g$, greater than 5 $m^2/g$, or even greater than 10 $m^2/g$. A desired material can have, e.g., a porosity of greater than 70 percent, e.g., greater than 80 percent, greater than 87.5 percent, greater than 90 percent, or even greater than 95 percent.

While some embodiments have been described that use screens to provide a desired fibrous material, in other embodiments, no screens are used to make the desired fibrous. For example, a fiber source can be sheared between a first pair of blades that defines a first gap, resulting in a first fibrous material. The first fibrous material can then be sheared between a second pair of blades that define a second gap that is smaller than the first gap, resulting in a second fibrous material.

Fibrous Materials Examples

Scanning electron micrographs were obtained on a JEOL 65000 field emission scanning electron microscope. Fiber lengths and widths (i.e., diameters) were determined by Integrated Paper Services, Inc., Appleton, Wis., using an automated analyzer (TAPPI T271). BET surface area were determined by Micromeritics Analytical Services, as were porosity and bulk density.

EXAMPLE 1

Preparation of Fibrous Material Front Polycoated Paper

Figure 11:
FIGS. 11 and 12 are scanning electron micrographs of a fibrous material produced from polycoated paper at 25× magnification and 1000× magnification, respectively. The fibrous material was produced on a rotary knife cutter utilizing a screen with ⅛ inch openings.
Figure 12:
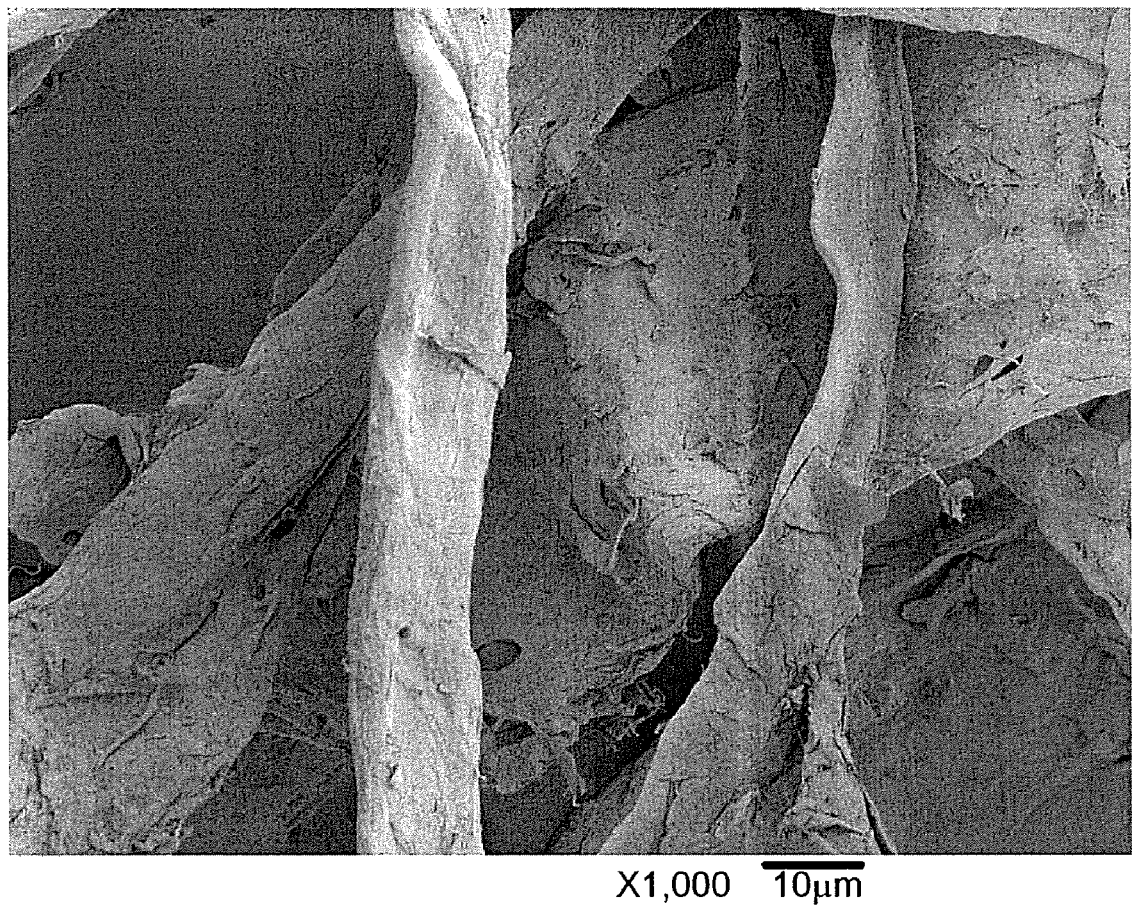

A 1500 pound skid of virgin, half-gallon juice cartons made of un-printed polycoated white Kraft board having a bulk density of 20 lb/ft$^3$ was obtained from International Paper. Each carton was folded flat, and then fed into a 3 hp Flinch Baugh shredder at a rate of approximately 15 to 20 pounds per hour. The shredder was equipped with two 12 inch rotary blades, two fixed blades and a 0.30 inch discharge screen. The gap between the rotary and fixed blades was adjusted to 0.10 inch. The output from the shredder resembled confetti having a width of between 0.1 inch and 0.5 inch, a length of between 0.25 inch and 1 inch and a thickness equivalent to that of the starting material (about 0.075 inch). The confetti-like material was fed to a Munson rotary knife cutter, Model SC30. Model SC30 is equipped with four rotary blades, four fixed blades, and a discharge screen having 1/8 inch openings. The gap between the rotary and fixed blades was set to approximately 0.020 inch The rotary knife cutter sheared the confetti-like pieces across the knife-edges, tearing the pieces apart and releasing a fibrous material at a rate of about one pound per hour. The fibrous material had a BET surface area of 0.9748 $m^2/g$+/−0.0167 $m^2/g$, a porosity of 89.0437 percent and a bulk density (@0.53 psia) of 0.1260 g/mL. An average length of the fibers was 1.141 mm and an average width of the fibers was 0.027 mm, giving an average L/D of 42:1. Scanning electron micrographs of the fibrous material are shown in FIGS. 11 and 12 at 25× magnification and 1000× magnification, respectively.

EXAMPLE 2

Preparation of Fibrous Material from Bleached Kraft Board

Figure 13:
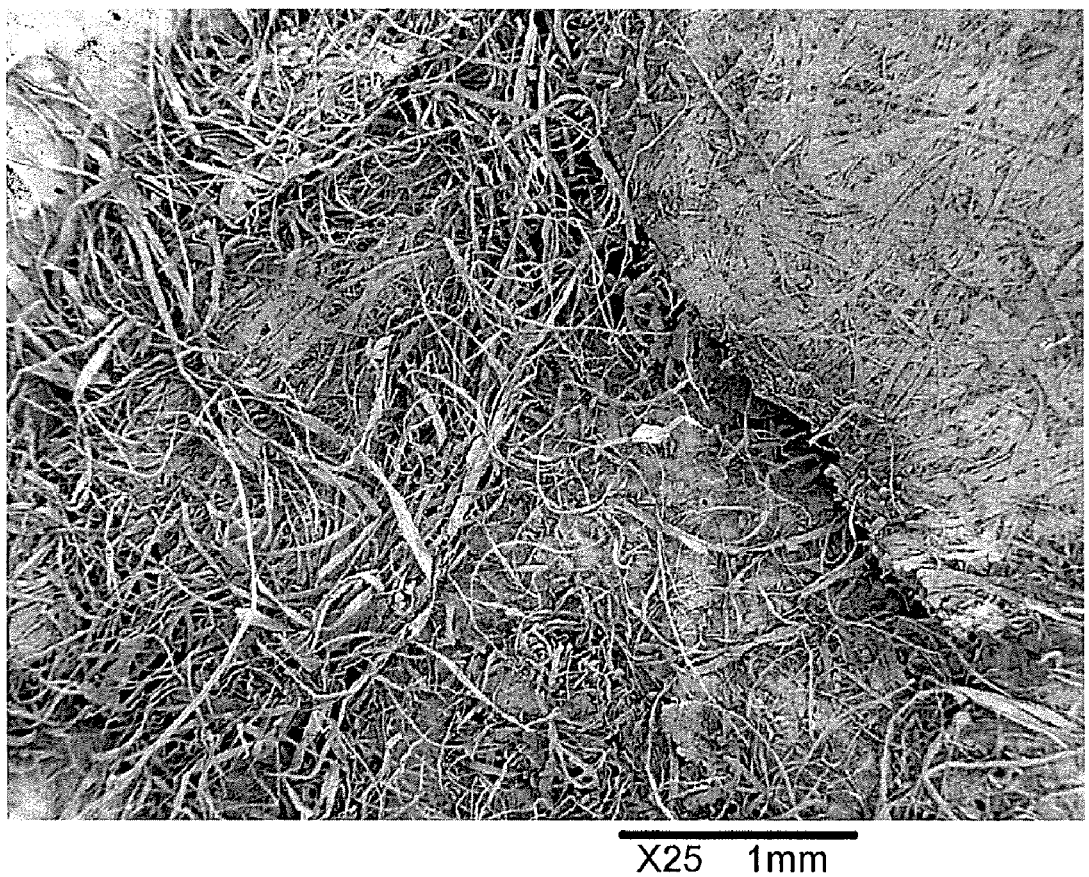
FIGS. 13 and 14 are scanning electron micrographs of a fibrous material produced from bleached Kraft board paper at 25× magnification and 1000× magnification, respectively. The fibrous material was produced on a rotary knife cutter utilizing a screen with ⅛ inch openings.
Figure 14:
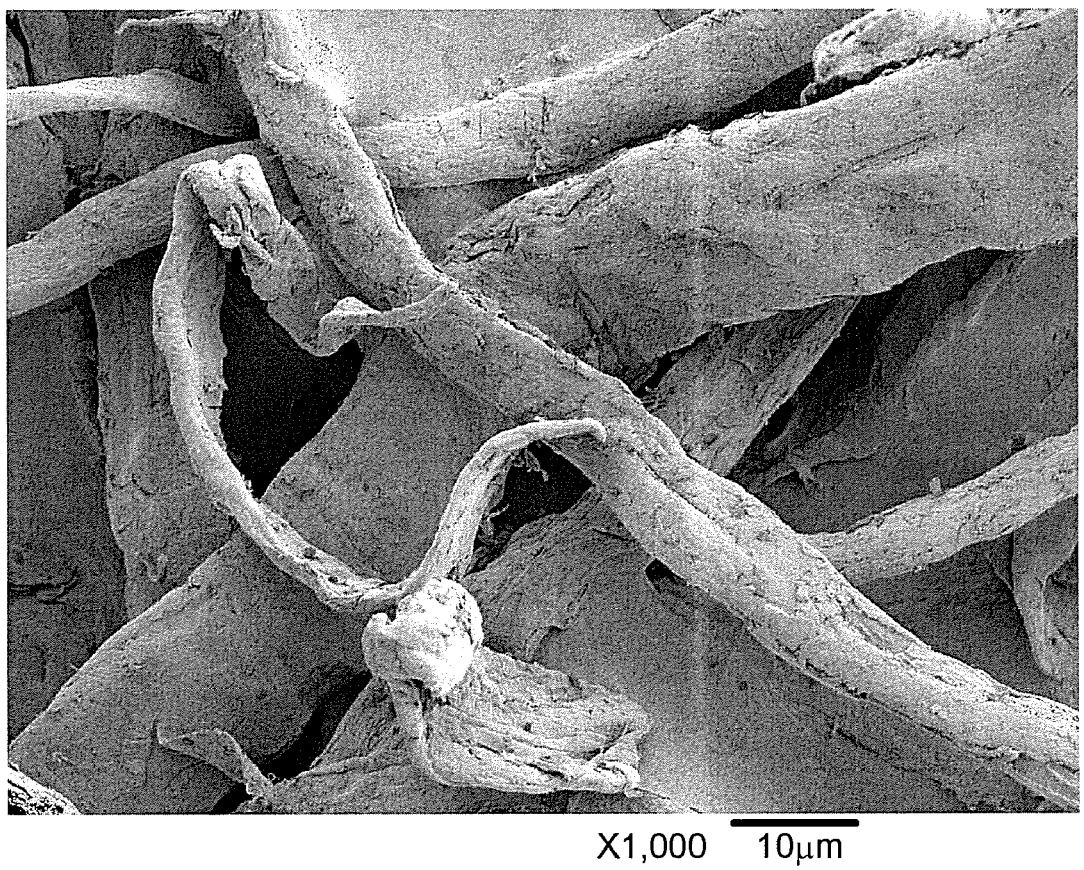

A 1500 pound skid of virgin bleached white Kraft board having a bulk density of 30 lb/ft$^3$ was obtained from International Paper. The material was folded flat, and then fed into a 3 hp Flinch Baugh shredder at a rate of approximately 15 to 20 pounds per hour. The shredder was equipped with two 12 inch rotary blades, two fixed blades and a 0.30 inch discharge screen. The gap between the rotary and fixed blades was adjusted to 0.10 inch. The output from the shredder resembled confetti having a width of between 0.1 inch and 0.5 inch, a length of between 0.25 inch and 1 inch and a thickness equivalent to that of the starting material (about 0.075 inch). The confetti-like material was fed to a Munson rotary knife cutter, Model SC30. The discharge screen had 1/8 inch openings. The gap between the rotary and fixed blades was set to approximately 0.020 inch. The rotary knife cutter sheared the confetti-like pieces, releasing a fibrous material at a rate of about one pound per hour. The fibrous material had a BET surface area of 1.1316 $m^2/g$+/−0.0103 $m^2/g$, a porosity of 88.3285 percent and a bulk density (@0.53 psia) of 0.1497 g/mL. An average length of the fibers was 1.063 mm and an average width of the fibers was 0.0245 mm, giving an average L/D of 43:1. Scanning electron micrographs of the fibrous material are shown in FIGS. 13 and 14 at 25× magnification and 1000× magnification, respectively.

EXAMPLE 3

Preparation of Twice Sheared Fibrous Material from Bleached Kraft Board

Figure 15:
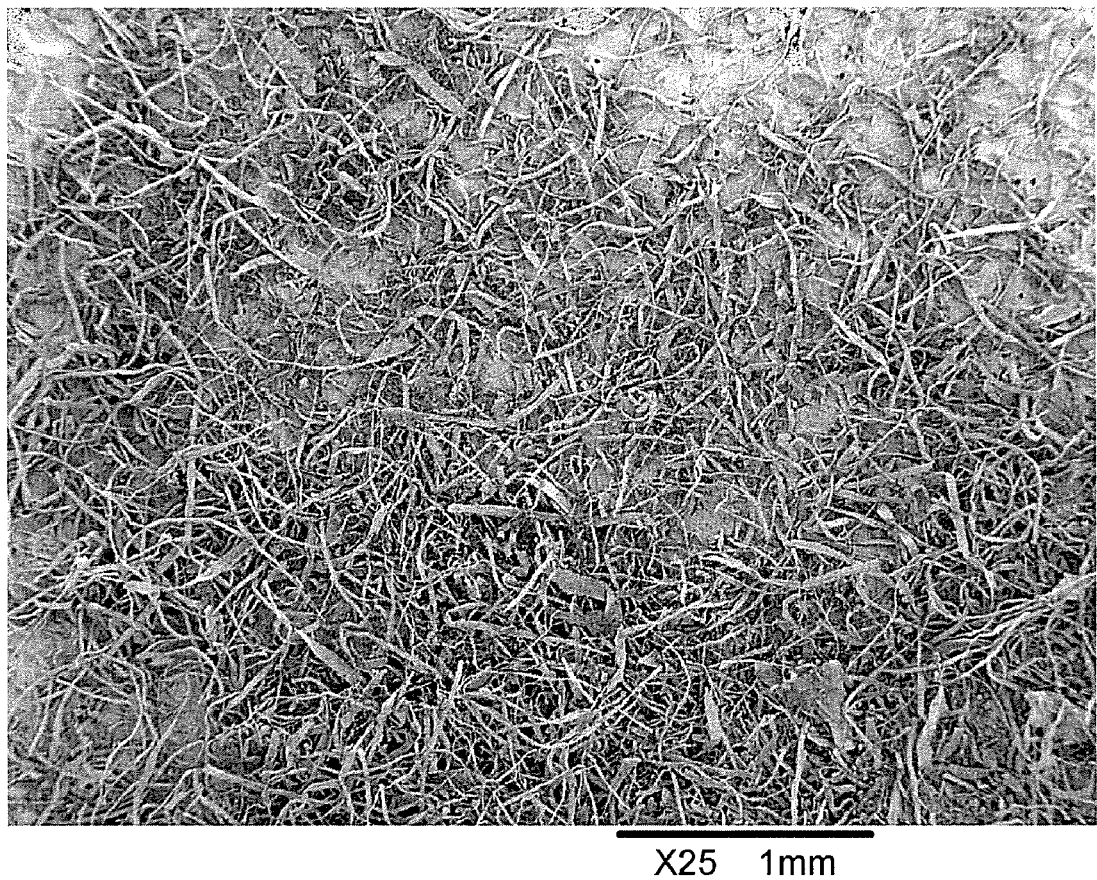
FIGS. 15 and 16 are scanning electron micrographs of a fibrous material produced from bleached Kraft board paper at 25× magnification and 1000× magnification, respectively. The fibrous material was twice sheared on a rotary knife cutter utilizing a screen with 1/16 inch openings during each shearing.
Figure 16:
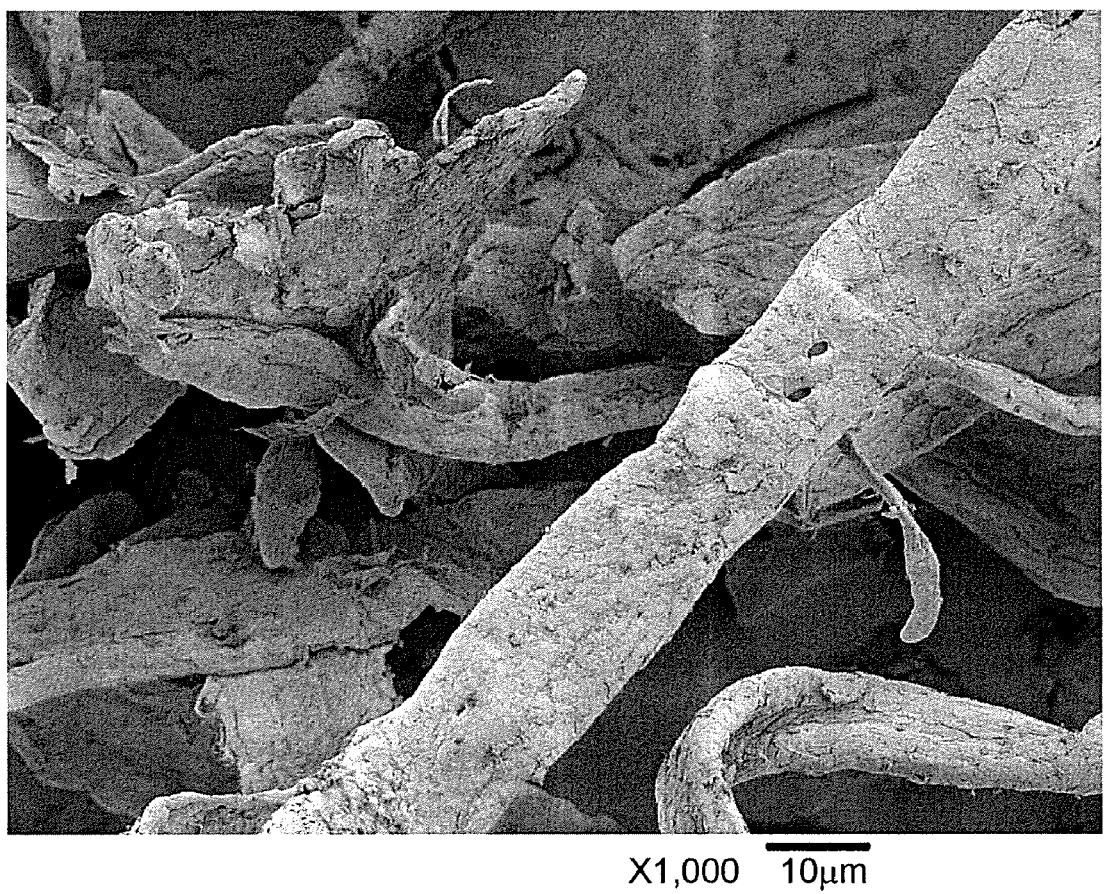

A 1500 pound skid of virgin bleached white Kraft board having a bulk density of 30 lb/ft$^3$ was obtained from International Paper. The material was folded flat, and then fed into a 3 hp Flinch Baugh shredder at a rate of approximately 15 to 20 pounds per hour. The shredder was equipped with two 12 inch rotary blades, two fixed blades and a 0.30 inch discharge screen. The gap between the rotary and fixed blades was adjusted to 0.10 inch. The output from the shredder resembled confetti (as above). The confetti-like material was fed to a Munson rotary knife cutter, Model SC30. The discharge screen had 1/16 inch openings. The gap between the rotary and fixed blades was set to approximately 0.020 inch. The rotary knife cutter the confetti-like pieces, releasing a fibrous material at a rate of about one pound per hour. The material resulting from the first shearing was fed back into the same setup described above and sheared again. The resulting fibrous material bad a BET surface area of 1.4408 $m^2/g$+/−0.0156 $m^2/g$, a porosity of 90.8998 percent and a bulk density (@0.53 psia) of 0.1298 g/mL. An average length of the fibers was 0.891 mm and an average width of the fibers was 0.026 mm, giving an average L/D of 34:1. Scanning electron micrographs of the fibrous material are shown in FIGS. 15 and 16 at 25× magnification and 1000× magnification, respectively.

EXAMPLE 4

Preparation of Thrice Sheared Fibrous Material from Bleached Kraft Board

Figure 17:
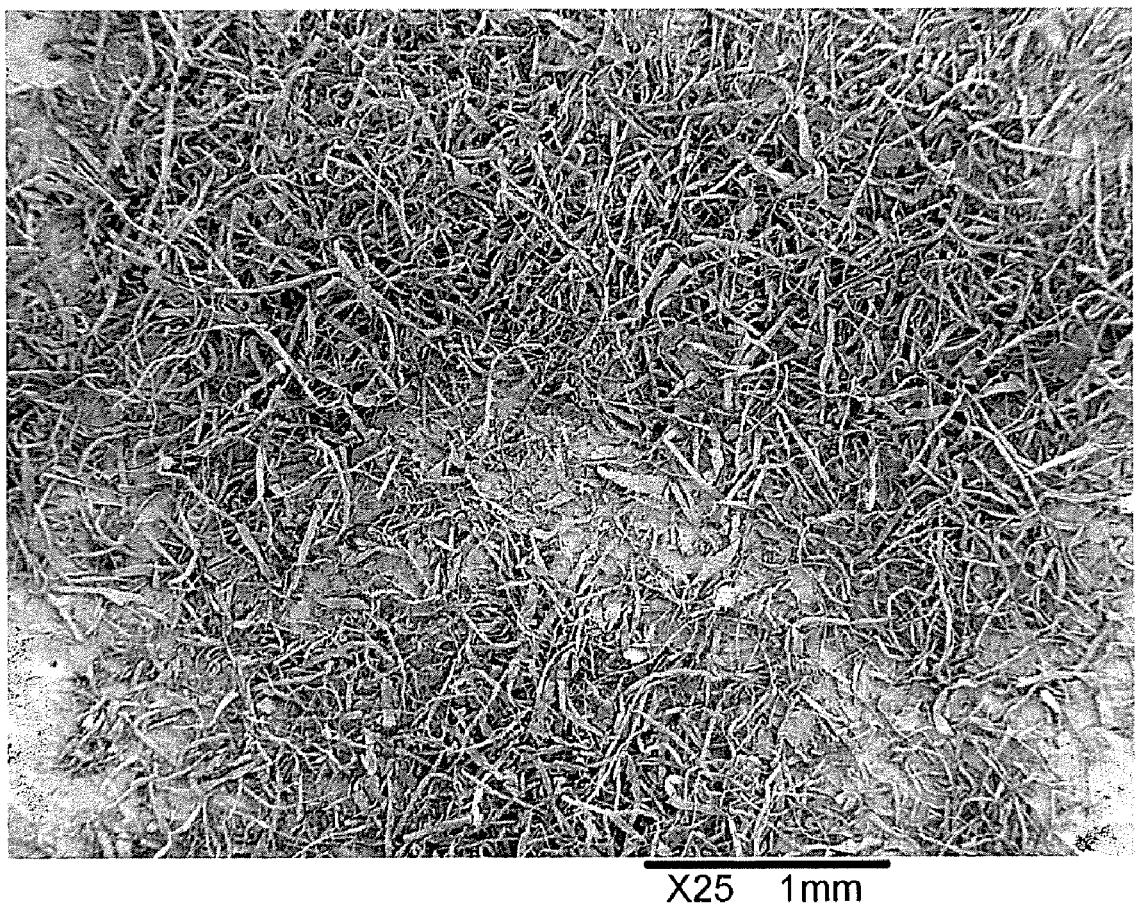
FIGS. 17 and 18 are scanning electron micrographs of a fibrous material produced from bleached Kraft board paper at 25× magnification and 1000× magnification, respectively. The fibrous material was thrice sheared on a rotary knife cutter. During the first shearing, a ⅛ inch screen was used; during the second shearing, a 1/16 inch screen was used, and during the third shearing a 1/32 inch screen was used.
Figure 18:
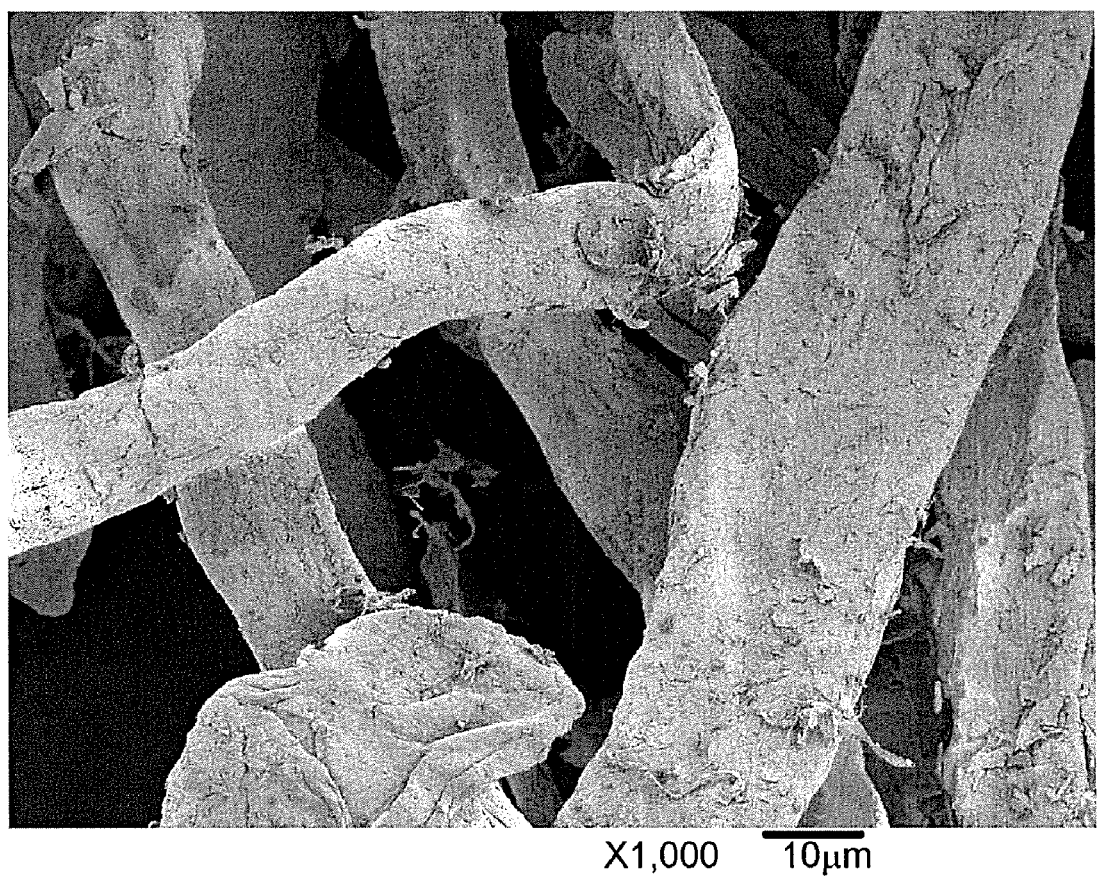

A 1500 pound skid of virgin bleached white Kraft board having a bulk density of 30 lb/ft$^3$ was obtained from International Paper. The material was folded flat, and then fed into a 3 hp Flinch Baugh shredder at a rate of approximately 15 to 20 pounds per hour. The shredder was equipped with two 12 inch rotary blades, two fixed blades and a 0.30 inch discharge screen. The gap between the rotary and fixed blades was adjusted to 0.10 inch. The output from the shredder resembled confetti (as above). The confetti-like material was fed to a Munson rotary knife cutter, Model SC30. The discharge screen had 1/8 inch openings. The gap between the rotary and fixed blades was set to approximately 0.020 inch. The rotary knife cutter sheared the confetti-like pieces across the knife-edges. The material resulting from the first shearing was fed back into the same setup and the screen was replaced with a 1/16 inch screen. This material was sheared. The material resulting from the second shearing was fed back into the same setup and the screen was replaced with a 1/32 inch screen. This material was sheared. The resulting fibrous material had a BET surface area of 1.6897 $m^2/g$+/−0.0155 $m^2/g$, a porosity of 87.7163 percent and a bulk density (@0.53 psia) of 0.1448 g/mL. An average length of the fibers was 0.824 mm and an average width of the fibers was 0.0262 mm, giving an average L/D of 32:1. Scanning electron micrographs of the fibrous material are shown in FIGS. 17 and 18 at 25× magnification and 1000× magnification, respectively.

Densification of Fibrous Materials

Figure 19:
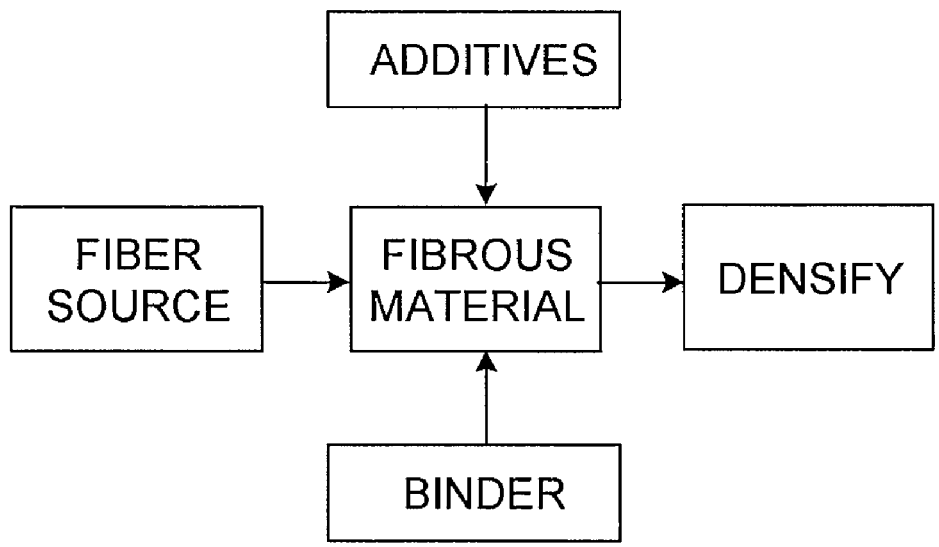
FIG. 19 is block diagram illustrating conversion of a fiber source into a fibrous material, and then densification of the fibrous material.

Referring to FIG. 19, a fiber source is converted to a fibrous material. The fibrous material is subsequently densified. A binder and, optionally, other additives, such as fillers and anti-static materials, are added to the fibrous material prior to densification. The fibrous material with binder and any desired additives or fillers is densified by application of pressure, e.g., by passing the fibrous material through a nip defined between counter-rotating pressure rolls by passing the fibrous material through a pellet mill, or by compounding the fibrous material and binder in an extruder (e.g., a single screw or double screw extruder). During the application of pressure, heat can optionally be applied to aid in the densification of the fibrous material.

The fiber source can be converted to the fibrous material, e.g., by mechanical means, e.g., cutting or shearing the fiber source, as discussed above.

Any of the fibrous materials discussed above and others can be densified. For example, the fibers of the fibrous material can have, e.g., an average length-to-diameter ratio (L/D) of greater than 3, e.g., 5, 6, 7, 8, 10, 10, 25, 50, or more, e.g., 100. In some embodiments, the fibers of the fibrous material have an average length of, e.g., 0.25 mm or more, e.g., 0.3 mm, 0.5 mm, 0.75 mm, 1 mm, 2 mm, 3 mm, 4 mm, 5 mm or more, e.g., 10 mm, and a maximum transverse dimension of greater than 0.05 mm, e.g., 0.075 mm, 0.1 mm, 0.2 mm, 0.3 mm, 0.4 mm, 0.5 mm or more, e.g., 1 mm. If desired, the fibers of the fibrous material may be separated, e.g., by screening, into fractions having different L/D ratios.

In some embodiments, the fibrous material prior to densification has a bulk density of less than 0.25 g/cm$^3$, e.g., 0.20 g/cm$^3$, 0.15 g/cm$^3$, 0.10 g/cm$^3$, 0.05 g/cm$^3$ or less, e.g., 0.025 g/cm$^3$. Bulk density is determined using ASTM D1895B. Briefly, the method involves filling a measuring cylinder of known volume with a sample and obtaining a weight of the sample. The bulk density is calculated by dividing the weight of the sample in grams by the known volume of the cylinder in cubic centimeters.

The fibrous material can be optionally treated, e.g., chemically treated or steam treated, to render the fibers of the fibrous material lipophilic, lipophobic, more adherent, and/or more dispersible or processable. For example, the fibrous material can plasma treated or chemically treated with, e.g., silanes.

The preferred binders include binders that are soluble in water, swollen by water, or that has a glass transition temperature of less 25° C., as determined by differential scanning calorimetry. By water-soluble binders, we mean binders having a solubility of at least about 0.05 weight percent in water. By water swellable binders, we mean binders that increase in volume by more than 0.5 percent upon exposure to water.

In some embodiments, the binders that are soluble or swollen by water include a functional group that is capable of forming a bond, e.g., a hydrogen bond, with the fibers of the fibrous material, e.g., cellulosic fibrous material. For example, the functional group can be a carboxylic acid group, a carboxylate group, a carbonyl group, e.g., of an aldehyde or a ketone, a sulfonic acid group, a sulfonate group, a phosphoric acid group, a phosphate group, an amide group, an amine group, a hydroxyl group, e.g., of an alcohol, and combinations of these groups, e.g., a carboxylic acid group and a hydroxyl group. Specific monomeric examples include glycerin, glyoxal, ascorbic acid, urea, glycine, pentaerythritol, a monosaccharide or a disaccharide, citric acid, and tartaric acid. Suitable saccharides include glucose, sucrose, lactose, ribose, fructose, mannose, arabinose and erythrose. Polymeric examples include polyglycols, polyethylene oxide, polycarboxylic acids, polyamides, polyamines and polysulfonic acids polysulfonates. Specific polymeric examples include polypropylene glycol (PPG), polyethylene glycol (PEG), polyethylene oxide, e.g., POLYOX®, copolymers of ethylene oxide and propylene oxide, polyacrylic acid (PAA), polyacrylamide, polypeptides, polyethylenimine, polyvinylpyridine, poly(sodium-4-styrenesulfonate) and poly(2-acrylamido-methyl-1-propanesulfonic acid).

In some embodiments, the binder includes a polymer that has a glass transition temperature less 25° C. Examples of such polymers include thermoplastic elastomers (TPEs). Examples of TPEs include polyether block amides, such as those available under the tradename PEBAX®, polyester elastomers, such as those available under the tradename HYTREL®, and styrenic block copolymers, such as those available under the tradename KRATON®. Other suitable polymers having a glass transition temperature less 25° C. include ethylene vinyl acetate copolymer (EVA), polyolefins, e.g., polyethylene, polypropylene, ethylene-propylene copolymers, and copolymers of ethylene and alpha olefins, e.g., 1-octene, such as those available under the tradename ENGAGE®. In some embodiments, for example when the fiber source used to make the fibrous material includes polycoated paper, the fibrous material is densified without the addition of a separate low glass transition temperature polymer. For example, fibrous material made from polycoated paper can be densified by heating to above about 50° C., e.g., 75° C., 80° C., 90° C., 100° C. or higher, e.g., 125° C., and by applying pressure during the heating, e.g., pressure greater than about 50 lb/in$^2$, e.g., 100 lb/in$^2$, 250 lb/in$^2$, 500 lb/in$^2$, 1000 lb/in$^2$ or higher, e.g., 2500 lb/in$^2$.

In a particular embodiment, the binder is a lignin, e.g., a natural or synthetically modified lignin.

In some embodiments, the fiber source used to make the fibrous material already includes a binder so that no additional binder needs to be added to effect densification.

The binder can serve other functions in addition to binding the fibrous material. For example, when the densified fibrous material is used to make composites, the binder can act as a compatibility or coupling aid, helping to compatibilize the resin of the composite and the fibrous material. Specific examples of such binders include modified polymers that have been functionalized, e.g., with maleic anhydride. Maleic anhydride grafted polymers are available from DuPont™ under the tradename FUSABOND®. Other specific examples include modified ethylene acrylate carbon monoxide terpolymers and ethylene vinyl acetates (EVAs), also available from DuPont™. If desired, the binder can include a fragrance or a scent.

A suitable amount of binder added to the fibrous material, calculated on a dry weight basis, is, e.g., from about 0.01 percent to about 50 percent, e.g., 0.03 percent, 0.05 percent, 0.1 percent, 0.25 percent, 0.5 percent, 1.0 percent, 5 percent, 10 percent or more, e.g., 25 percent, based on a total weight of the densified fibrous material. The binder can be added to the fibrous material as a neat, pure liquid, as a liquid having the binder dissolved therein, as a dry powder of the binder, or as pellets of the binder.

In other embodiments, the amount of binder added to the fibrous material is greater than 50 percent (calculated on a dry weight basis), e.g., greater than 55 percent, greater than 60 percent, greater than 65 percent, greater than 75 percent, or even greater than 85 percent. These embodiments may have, e.g., less than 90 percent polymer (e.g., a thermoplastic polymer).

Figure 20:
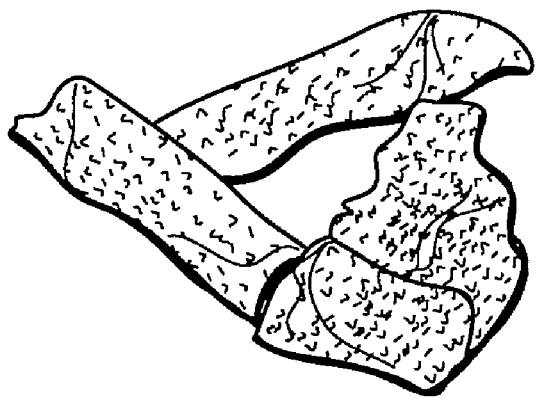
FIG. 20 is a densified fibrous material in pellet form.

The fibrous material, after densification, can be in the form of pellets (FIG. 20) or chips having a variety of shapes, the desired shape is, in part, dependent upon the application. For example, when the pellets or chips are to be dry blended with a resin, and then the blend plasticized and molded to form composite parts, it is often convenient for the pellets or chips to be cylindrical in shape, e.g., having a maximum transverse dimension of, e.g., 1 mm or more, e.g., 2 mm, 3 mm, 5 mm, 8 mm, 10 mm, 15 mm or more, e.g., 25 mm. Another convenient shape for making composites includes pellets or chips that are plate-like in form, e.g., having a thickness of 1 mm or more, e.g., 2 mm, 3 mm, 5 mm, 8 mm, 10 mm or more, e.g., 25 mm; a width of, e.g., 5 mm or more, e.g., 10 mm, 15 mm, 25 mm, 30 mm or more, e.g., 50 mm; and a length of 5 mm or more, e.g., 10 mm, 15 mm, 25 mm, 30 mm or more, e.g., 50 mm.

Figure 20A:
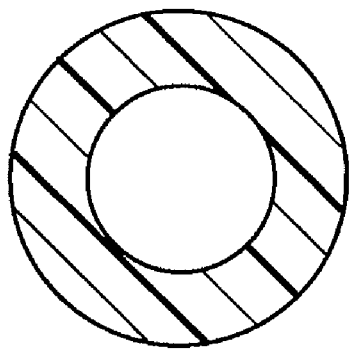
FIG. 20A is a transverse cross-section of a hollow pellet in which a center of the hollow is in-line with a center of the pellet.
Figure 20B:
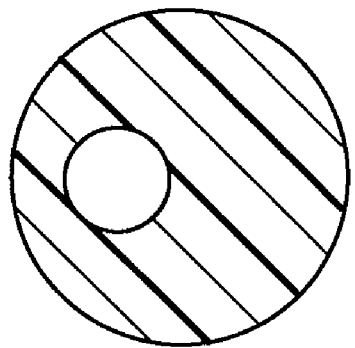
FIG. 20B is a transverse cross-section of a hollow pellet in which a center of the hollow is out of line with the center of the pellet.

Referring now to FIGS. 20A and 20B, the pellets can be made by extrusion through a die having a solid central portion such that the corresponding pellet has a hollow inside. As shown, the hollow can be generally in-line with the center of the pellet (FIG. 20A), or out of line with the center of the pellet (FIG. 20B). Making the pellet hollow inside can decrease the cooling time needed to fully set up the pellet, and can, therefore, increase the speed of the pellet formation. Each pellet can be the same or different transverse cross-section.

Figure 20C:
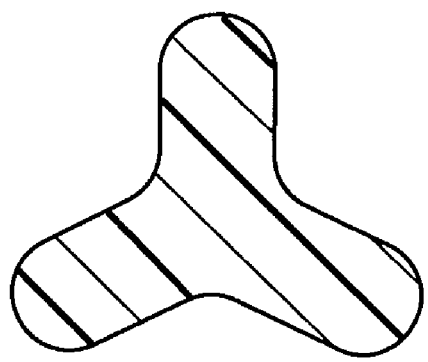
FIG. 20C is a transverse cross-section of a tri-lobal pellet.

Referring now to FIG. 20C, the pellet can have, e.g., a transverse shape that is multi-lobal, e.g., tri-lobal as shown, or tetra-lobal, penta-lobal, hexa-lobal or deca-lobal. Making the pellets in such transverse shapes can decrease cooling time.

As discussed above, the pellets can be used, e.g., to form composites. The pellets or chips can also be used as themselves, e.g., as absorbents or controlled release matrices. As controlled release matrices, the pellets or chips can be used, e.g., to fertilize grass, to release drugs or biocides, or to release fragrances. As absorbents, the pellets or chips can be used, e.g., as pet bedding, packaging material or in pollution control systems. In embodiments where the pellets or chips are used as controlled release matrices, the pellets or chips can include a polymer, e.g., a degradable material. Representative degradable polymers include polyhydroxy acids, e.g., polylactides, polyglycolides and copolymers of lactic acid and glycolic acid, poly(hydroxybutyric acid), poly(hydroxyvaleric acid), poly[lactide-co-($\epsilon$-caprolactone)], poly[glycolide-co-($\epsilon$-caprolactone)], polycarbonates, poly(amino acids), poly(hydroxyalkanoate)s, polyanhydrides, polyorthoesters and blends of these polymers.

The densified fibrous material, together with a resin, can be used to form articles such as pipes, panels, decking materials, boards, housings, sheets, blocks, bricks, poles, fencing, members, doors, shutters, awnings, shades, signs, frames, window casings, backboards, flooring, tiles, railroad ties, trays, tool handles, stalls, films, wraps, tapes, boxes, baskets, racks, casings, binders, dividers, walls, mats, frames, bookcases, sculptures, chairs, tables, desks, toys, games, pallets, wharves, piers, boats, masts, septic tanks, automotive panels, computer housings, above- and below-ground electrical casings, furniture, picnic tables, benches, shelters, trays, hangers, servers, caskets, book covers, canes and crutches.

The pellets or chips have a variety of densities, the desired density, in part, depending upon the application. For example, when the pellets or chips are to be used 5 in making composites, the pellets or chips can have, e.g., a density of about 0.11 g/cm$^3$, 0.15 g/cm$^3$, 0.20 g/cm$^3$, 0.25 g/cm$^3$, 0.3 g/cm$^3$, 0.4 g/cm$^3$, 0.5 g/cm$^3$, 0.6 g/cm$^3$, or more, e.g., 0.8 g/cm$^3$. When used to make composites, it is often advantageous to select a density such that the pellets come apart under shear and/or heat to release the fibrous material from which the pellet or chip is formed. For many applications, the densified fibrous material can be substituted for fibrous material since the densified fibrous material is converted back into a fibrous material inside a processing device, e.g., an extruder or an injection molding machine.

Figure 21:
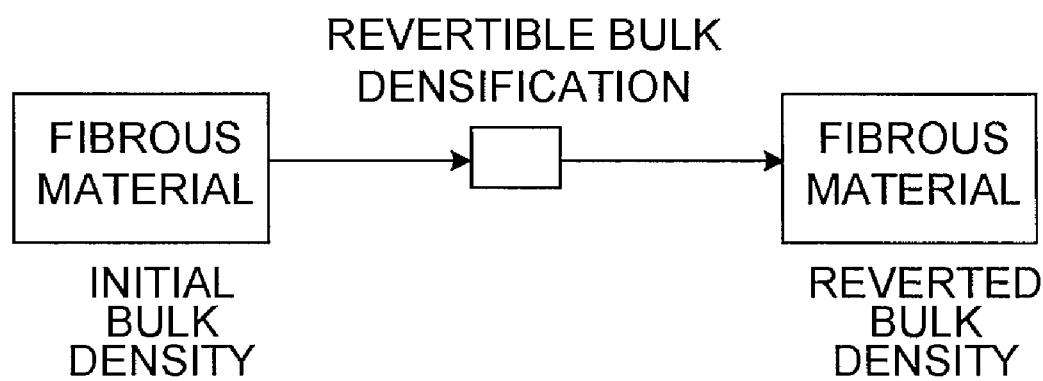
FIG. 21 is a block diagram illustrating revertible bulk densification.

Referring to FIG. 21, a fibrous material having a low bulk density can be revertibly densified without using a binder to a fibrous material having a higher bulk density. For example, a fibrous material having a bulk density of 0.05 g/cm$^3$ can be densified by sealing the fibrous material in a relatively air impermeable bag, and then evacuating air from the bag. After evacuation of the air from the bag, the fibrous material can have, e.g., a bulk density of greater than 0.3 g/cm$^3$, e.g., 0.5 g/cm$^3$, 0.6 g/cm$^3$, 0.7 g/cm$^3$ or more, e.g., 0.85 g/cm$^3$. This can be advantageous when it is desirable to transport the fibrous material to another location, e.g., a remote manufacturing plant, prior to densification of the fibrous material with a binder. After piercing the air impermeable bag, the densified fibrous material reverts to nearly its initial bulk density, e.g., greater than 60 percent of its initial bulk density, e.g., 70 percent, 80 percent, 85 percent or more, e.g., 95 percent of its initial bulk density. To reduce static electricity in the fibrous material, an anti-static agent can be added to the fibrous material. For example, a chemical anti-static compound, e.g., a cationic compound, e.g., quaternary ammonium compound, can be added to the fibrous material. Static in the fibrous material can also be reduced, e.g., by induction, grounding or by ionization.

Figure 22:
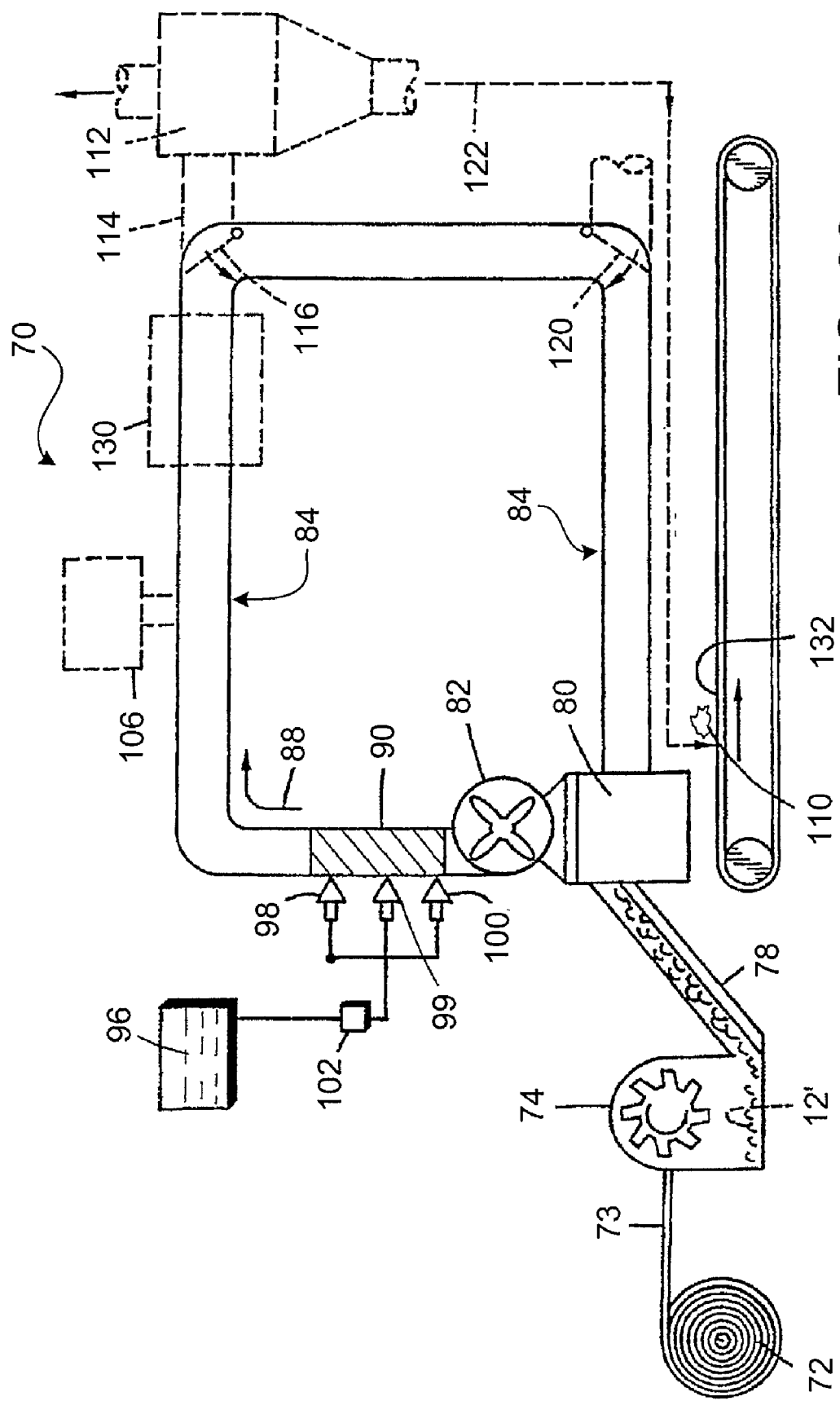
FIG. 22 is schematic side view of a process for coating a fibrous material with a binder and/or adding additives to the fibrous material.

FIG. 22 explains operation of a fibrous material generating and treating device 70. Paper sheet 73, e.g., scrap bleached Kraft paper sheet, is supplied from a roll 72 and delivered to a fiberizing apparatus 74, such as a rotary shearer. The sheet 73 is converted into fibrous material 12' and is delivered to a fiber-loading zone 80 by conveyer 78. If desired, the fibers of the fibrous material may be separated, e.g., by screening, into fractions having different L/D ratios. In some embodiments, the fibrous material 12' is delivered continuously to zone 80, and in other embodiments, the fibrous material is delivered in batches. A blower 82 in loop 84 is positioned adjacent to the fiber-loading zone 80 and is capable of moving a gaseous medium, e.g., air, at a velocity and volume sufficient to circulate the fibrous material 12' in a direction indicated by arrow 88 through loop 84.

In some embodiments, the velocity of air traveling in the loop is sufficient to uniformly disperse and transport the fibrous material around the entire loop 84. In some embodiments, the velocity of flow is greater than 2,500 feet/minute, e.g., 5,000 feet/minute, 6,000 feet/minute or more, e.g., 7,500 feet/minute.

The entrained fibrous material 12' traversing the loop passes a binder application zone 90, which forms part of loop 84, where binder is applied. In operation, binder application zone 90 applies a liquid binder solution 96 to the circulating fibrous material via nozzles 98, 99 and 100. The nozzles produce an atomized spray or mist of binder material, which impacts and coat the fibers as the fibers pass in proximity to the nozzles. Valve 102 is operated to control the flow of liquid binder material to the respective nozzles 98, 99, and 100. After a desired quantity of binder material is applied, the valve 102 is closed.

In some embodiments, the binder application zone 90 is two to one hundred feet long or more, e.g., 125 feet, 150 feet, 250 feet long or more, e.g., 500 feet long. Longer binder application zones allow for application of binder over a longer period of time during passage of fibrous material 12' through application zone 90. In some embodiments, the nozzles are spaced apart from about three to about four feet along the length of loop 84.

In some embodiments, the binder provides a coating over a substantial majority of the surface area of each fiber of the fibrous material 12', e.g., fifty percent or more, e.g., sixty percent, seventy percent, seventy five percent or more, e.g., eighty percent. In some embodiments, the binder forms a coating which is about 1 micron thick or less, e.g., 0.5, 0.3 micron or less, e.g., 0.1 micron.

Any of the additives and/or fillers described herein can optionally be added to the loop 84 from a supply 106 during circulation of fibrous material 12' to form a blend of fibers and additives.

In some embodiments, following the application of the liquid binder material to the fibrous material 12', the coated fibrous material 110 is removed from loop 84 via a separator 112, which is selectively connected to loop 84 by section 114 and gate valve 116. When valve 116 is opened, another valve 120 is also opened to allow air to enter the loop 84 to compensate for air exiting through separator 112. With separator 112 in the loop, the coated fibrous material is collected in separator 112, and then removed from the separator by outlet 122.

In some embodiments, the fibrous material is dried with an optional heater 130 before the material is removed from loop 84. For example, heated air may be blended with the air flowing through the conduit to accelerate the drying off the liquid, e.g., water, in which the binder is incorporated.

Figure 23:
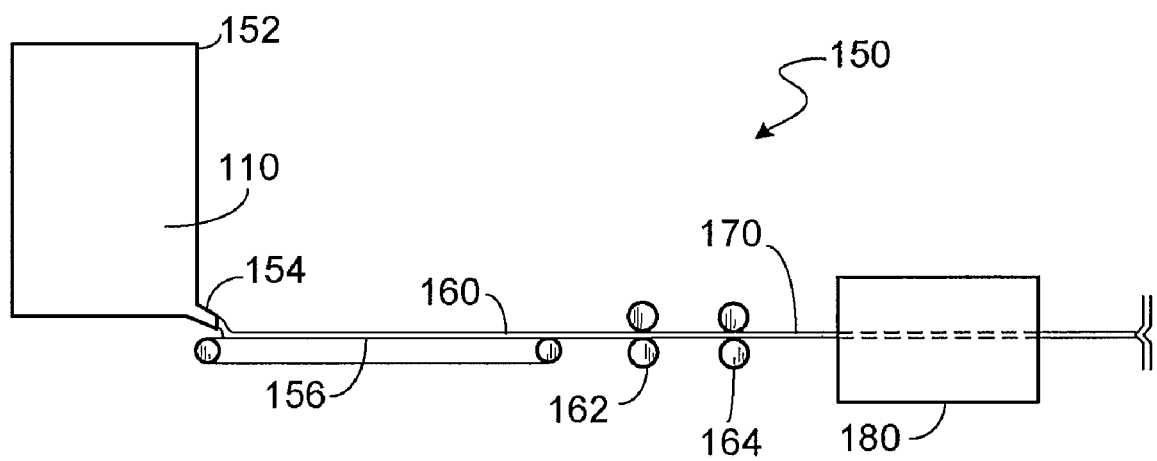
FIG. 23 is a schematic side view of a process for forming a densified fibrous material.
Figure 24:
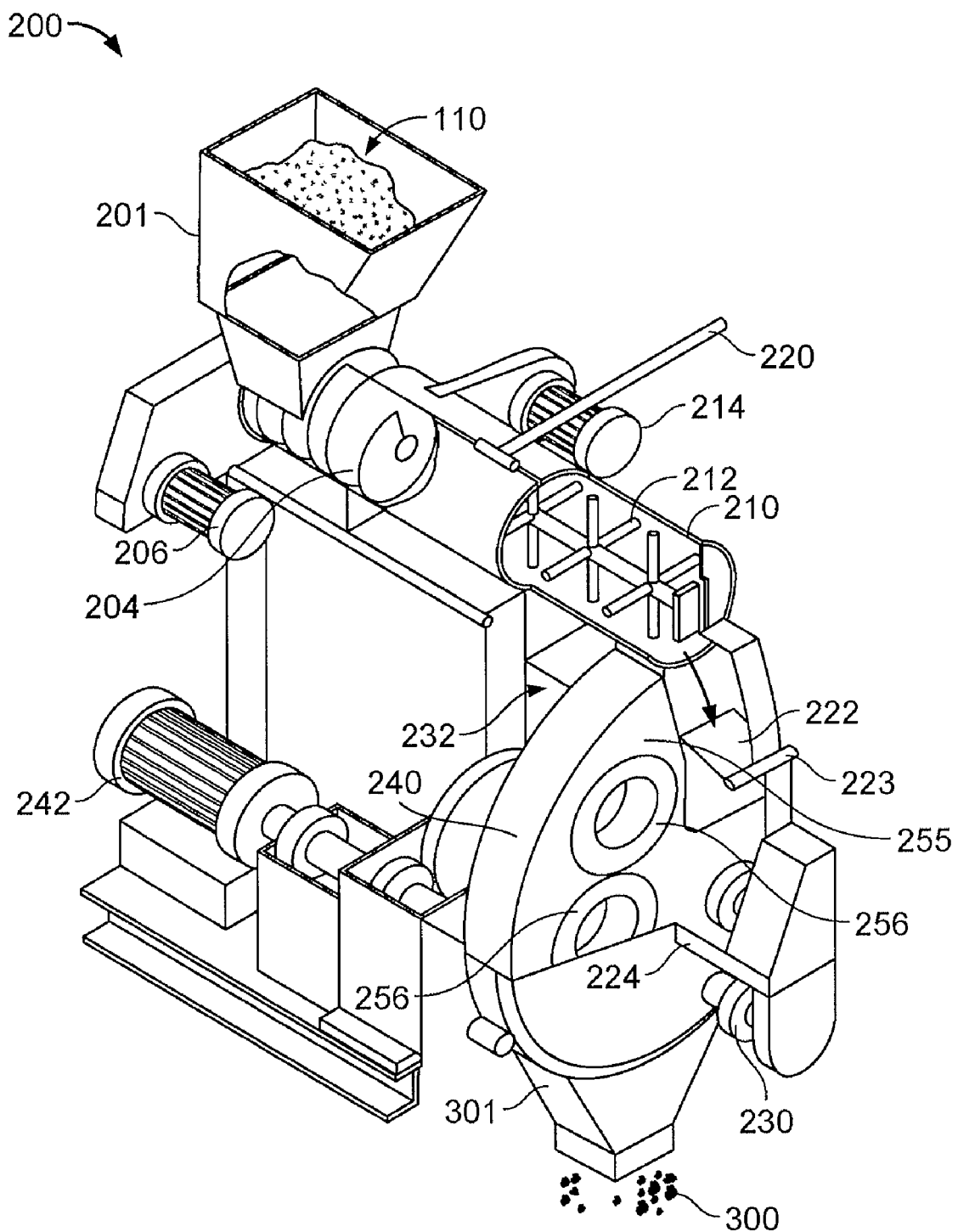
FIG. 24 is a perspective view in cut-away of a pellet mill.

The coated fibrous material is transferred from outlet 122 loosely onto a conveyor 132 where it is transferred to densification station 150 shown in FIG. 23 or densification station 200 shown in FIG. 24.

Referring to FIG. 23, the coated fibrous material 110 from above is delivered from a headbox 152 through a slit 154 and onto a screen 156, e.g., a Fourdrinier screen. Excess water is drawn away from the coated fibrous material 110 deposited on screen 156 by a conventional vacuum system under the screen (not shown), leaving a deposited undensified fibrous material 160 that includes the binder. The undensified fibrous 160 material is then transferred to two sets of calendar rolls 162, 164, each defining a respective nip through which the fibrous material passes. After passing through the nips, the undried densified material 170 enters a drying section 180 where it is dried, and then is chopped into pellet or chip form.

In an alternative embodiment, the densified fibrous material can be made in a pellet mill. Referring to FIG. 24, a pellet mill 200 has a hopper 201 for holding the undensified fibrous material 110. The hopper 201 communicates with an auger 204 that is driven by variable speed motor 206 so that undensified fibrous material 110 can be transported to a conditioner 210 that stirs the undensified material 110 with paddles 212 that are rotated by conditioner motor 214. Other ingredients, e.g., any of the additives and/or fillers described herein, can be added at inlet 220. If desired, heat may be added while the fibrous material is in conditioner 210.

After conditioned, the fibrous material passes from the conditioner 210 through a dump chute 222, and to another auger 224. The dump chute 222, as controlled by actuator 223, allows for unobstructed passage of the fibrous material from conditioner 210 to auger 224. Auger 224 is rotated by motor 230, and controls the feeding of the fibrous material into die and roller assembly 232. Specifically, the fibrous material is introduced into a hollow, cylindrical die 240 which rotates about a horizontal axis and which has radially extending die holes 250. Die 240 is rotated about the axis by motor 242, which includes a horsepower gauge, indicating total power consumed by the motor 242.

A set of rollers 256 roll about the inner circumference of die 240, around axes parallel to that of die 240, to press the fibrous material through the die holes 250, forming pellets 300, which fall from chute 301 and which are captured and boxed.

Figure 25:
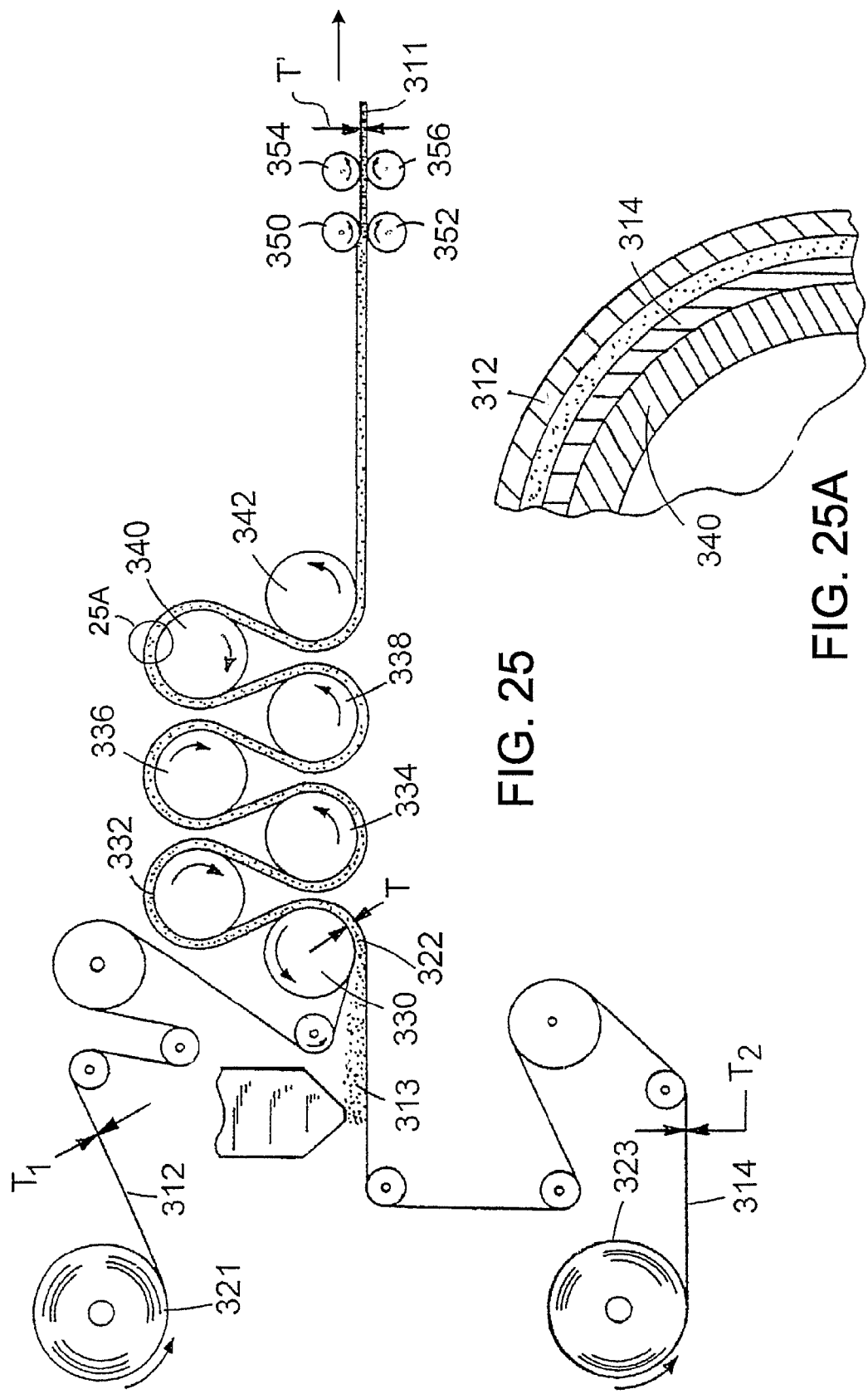
FIG. 25 is a schematic side view of a process for manufacturing a densified fibrous material.

The fibrous material discussed above can be densified using other methods. For example, referring to FIGS. 25 and 25A, an apparatus 310 can be used to form a densified fibrous material 311, e.g., a composite, e.g., a pressboard. As shown, the densified fibrous material 311 is formed from a fibrous material-binder combination 313 by laminating the fibrous material-binder combination 313 between members 312 and 314. Laminating is accomplished, e.g., by applying pressure alone or by applying heat and pressure to an uncompressed composite 322. The fibrous material-binder combination 313 can optionally include any of the additives discussed above.

Apparatus 310 includes first and second members 312 and 314 provided from rolls 321 and 323, respectively, and a hopper 320 for holding the fibrous material, binder and any additives. The fibrous material, binder and any additives are delivered between members 312 and 314 to form an uncompressed composite 322. The uncompressed composite 322 is then passed through a series of heated rolls 330, 332, 334, 336, 338, 340 and 342 that define a serpentine pathway, and then through nip rolls 350, 352 and 354, 356 to produce composite 311. Agitators can be provided within hopper 320 to ensure that the fibrous material, binder and any additives do not clog or foul the feeding operation. The uncompressed composite 322 is partially densified after passing through the serpentine pathway defined by heated rolls 330, 332, 334, 336, 338 and 340, and then is fully densified to form composite 311 by passing through nip rolls 350, 352 and 354, 356.

In some embodiments, the fiber source used to make the fibrous material already includes a binder. In such a case, no additional binder needs to be added to effect densification. For example, when the fiber source used to make the fibrous material includes polycoated paper, the fibrous material is densified without the addition of a separate binder, e.g., a low glass transition temperature polymer.

Nip rolls 354, 356 can be rotated so that each has a surface speed greater than each nip roll 350, 352. In such a configuration, the densified fibrous material is stretched between nip rolls 350, 352 and nip rolls 354, 356. In some implementations, stretching the densified fibrous material is desirable because stretching can improve many mechanical properties of the composite, e.g., flexural modulus, bend resistance and tensile strength.

The members, e.g., webs, can be made of, e.g., polycoated paper, plastic film, plastic stock or a textile scrim material, e.g., a woven or non-woven textile scrim material. When it is desirable to minimize the amount of member material in the densified fibrous material, a thickness $T_1$ and $T_2$ of members 312 and 314, respectively, can be, e.g., less than 0.050 inch, e.g., 0.040 inch, 0.025 inch, 0.020 inch, 0.010 inch, 0.005 inch or less, e.g., 0.0025 inch. When it is desirable to maximize the mechanical properties of the densified fibrous material, the thickness $T_1$ and $T_2$ of members 312 and 314, respectively, can be greater than 0.050 inch, e.g., 0.060 inch, 0.065 inch, 0.075 inch, 0.085 inch, 0.100 inch, 0.150 inch, 0.250 inch, 0.75 inch or more, e.g., 2.00 inch.

In some implementations, the rolls 330, 332, 334, 336, 338 and 340 are heated to between 300° F. to about 500° F. In embodiments in which plastic film is used as a member material, these temperatures act to quickly soften the polymeric material of the film.

In some implementations, heated rolls 330, 332, 334, 336, 338 and 340 are between about 5 inches in diameter to about 42 inches in diameter, e.g., 10 inches, 15 inches, 20 inches, 25 inches or larger, e.g., 36 inches.

The member feed rate can be, e.g., between about 3.5 feet per minute to about 250 feet per minute, e.g., 25 feet per minute, 50 feet per minute, 100 feet per minute or higher, e.g., 175 feet per minute.

Nip rolls 350, 352 and 354, 356 can be heated or unheated. When heated, they are typically heated to a temperature less than heated rolls 330, 332, 334, 336, 338 and 340 to allow the materials that will form the densified fibrous material to begin to cool and set. For example, nip rolls 350, 352 and 354, 356 are heated to between 100° F. to about 300° F. Pressure between the nip rolls is, e.g., at least about 500 pounds per linear inch, e.g., 1,000 pounds per linear inch, 2,500 pounds per linear inch, 5,000 pounds per linear inch or more, e.g., 25,000 pounds per linear inch.

In some implementations, a thickness T' of the densified fibrous material 311 is at least about two times less than a thickness T of the uncompressed composite 322, e.g., three times, four times, five times or less, e.g., ten times less. Accordingly, the bulk density of the densified fibrous material is greater than the uncompressed composite. For example, the density of the uncompressed composite can be, e.g., less than 0.25 g/cm³, e.g., 0.20 g/cm³, 0.15 g/cm³, 0.10 g/cm³, 0.05 g/cm³ or less, e.g., 0.025 g/cm³, and the bulk density of the densified fibrous material can be, e.g., greater than about 0.3 g/cm³, e.g., 0.4 g/cm³, 0.5 g/cm³, 0.6 g/cm³, or more, e.g., 0.8 g/cm³.

Cooled densified fibrous material 311 can be rolled up or cut into sheets. Densifying a fibrous material between members can be advantageous when it is desirable to transport the fibrous material to another location, e.g., a remote manufacturing plant. After reaching the other location, the densified fibrous material can be re-converted into a fibrous material by any of the methods discussed herein.

Alternatively, cooled densified fibrous material can be used in a variety of applications. For example, it can be used for sound-proofing, insulation, structural members, high strength boxes, and partition walls.

While embodiments have been described in which a binder is applied to a fibrous material by spraying a binder solution, e.g., a binder solution containing the binder dissolved in water, onto the fibrous material, in some embodiments, the binder is applied to the fibrous material as neat liquid of the binder or as a dry powder. The binder can also be applied as a gaseous material.

While embodiments have been shown in which a fibrous material is converted into a densified fibrous web, and then the densified fibrous material is immediately cut into pellets or chips, in some embodiments, the densified fibrous material is first collected in a roll. The densified fibrous web can be used, e.g., as an absorbent mat material, or it can be transported to a remote manufacturing site where it is converted into pellets or chips. The densified fibrous web material can be a convenient form in which to transport the fibrous material because of its higher bulk density.

While embodiments have been described in which single layer members 312 and 314 are used to form a densified fibrous material 311, e.g., a composite, in some embodiments, multilayer members are used. For example, members can each have, e.g., two layers, three layers, five layers or more, e.g., seven layers. In addition, while densified fibrous materials have been described in which fibrous material is sandwiched between two members, in some embodiments, a densified fibrous material is made by compressing a fibrous material that is under a single member.

Densified Fibrous Materials Examples

EXAMPLE 5

Preparation of densified Fibrous Material from Bleached Kraft Board without Added Binder Fibrous material was prepared according to Example 2. Approximately 1 lb of water was sprayed onto each 10 lb of fibrous material. The fibrous material was densified using a California Pellet Mill 1100 operating at 75° C. Pellets were obtained having a bulk density ranging from about 7 lb/ft³ to about 15 lb/ft³.

EXAMPLE 6

Preparation of Densified Fibrous Material from Bleached Kraft Board with Binder

Fibrous material was prepared according to Example 2.
A 2 weight percent stock solution of POLYOX™ WSR N10 (polyethylene oxide) was prepared in water.

Approximately 1 lb of the stock solution was sprayed onto each 10 lb of fibrous material. The fibrous material was densified using a California Pellet Mill 1100 operating at 75° C. Pellets were obtained having a bulk density ranging from about 15 lb/ft³ to about 40 lb/ft³.

Fibrous Material/Resin Composites

Composites including any of the above discussed fibrous materials (including the densified fibrous materials) or blends of any of the above fibrous materials, e.g., the first 12 or second fibrous material 14, and a resin, e.g., a thermoplastic resin or a thermosetting resin, can be prepared by combining the desired fibrous material and the desired resin. The desired fibrous material can be combined with the desired resin, e.g., by mixing the fibrous material and the resin in an extruder or other mixer. To form the composite, the fibrous material can be combined with the resin as the fibrous material itself or as a densified fibrous material that can be re-opened during the combining.

Examples of thermoplastic resins include rigid and elastomeric thermoplastics. Rigid thermoplastics include polyolefins (e.g., polyethylene, polypropylene, or polyolefin copolymers), polyesters (e.g., polyethylene terephthalate), polyamides (e.g., nylon 6, 6/12 or 6/10), and polyethyleneimines. Examples of elastomeric thermoplastic resins include elastomeric styrenic copolymers (e.g., styrene-ethylene-butylene-styrene copolymers), polyamide elastomers (e.g., polyether-polyamide copolymers) and ethylene-vinyl acetate copolymer.

In some embodiments, the thermoplastic resin has a melt flow rate of between 10 g/10 minutes to 60 g/1 minutes, e.g., between 20 g/10 minutes to 50 g/10 minutes, or between 30 g/10 minutes to 45 g/10 minutes, as measured using ASTM 1238.

In some embodiments, compatible blends of any of the above thermoplastic resins can be used.

In some embodiments, the thermoplastic resin has a polydispersity index (PDI), i.e., a ratio of the weight average molecular weight to the number average molecular weight, of greater than 1.5, e.g., greater than 2.0, greater than 2.5, greater than 5.0, greater than 7.5, or even greater than 10.0.

In specific embodiments, polyolefins or blends of polyolefins are utilized as the thermoplastic resin.

Examples of thermosetting resins include natural rubber, butadiene-rubber and polyurethanes.

Generally, the fibers of the fibrous materials can have a relatively large average length-to-diameter ratio (e.g., greater than 20-to-1), even if they have been sheared more than once. In addition, the fibers of the fibrous materials described herein may have a relatively narrow length and/or length-to-diameter ratio distribution. Without wishing to be bound by any particular theory, it is currently believed that the relatively large average length-to-diameter ratio and the relatively narrow length and/or length-to-diameter ratio distribution are, at least in part, responsible for the ease at which the fibrous materials are dispersed in a resin, e.g., a molten thermoplastic resin. It is also believed that the relatively large average length-to-diameter ratio and the relatively narrow length and/or length-to-diameter ratio distribution are, at least in part, responsible for the consistent properties of the fibrous materials, the predictable rheology modification the fibrous materials impart on a resin, the ease at which the combinations of the fibrous materials and resins are cast, extruded and injection molded, the ease in which the fibrous materials pass through small, often torturous channels and openings, and the excellent surface finishes possible with molded parts, e.g., glossy finishes and/or finishes substantially devoid of visible speckles, when this is desired.

During the forming of the composite, a chemical foaming agent, e.g., an endothermic or exothermic foaming agent, can be used, and/or a gas, e.g., nitrogen or carbon dioxide, can be injected into the mixture. This can be advantageous when large cross-section articles are formed, e.g., to prevent sinking, to reduce part density and/or to reduce cooling time. Chemical foaming agent are available from Clariant Corporation, e.g., under the tradename HYDROCEROL®.

Additives

Any of the following additives can added to the fibrous materials, densified fibrous materials and composites described herein. Additives, e.g., in the form of a solid, a liquid or a gas, can be added, e.g., to the combination of a fibrous material and resin. Additives include fillers such as calcium carbonate, graphite, wollastonite, mica, glass, fiber glass, silica, and talc; inorganic flame retardants such as alumina trihydrate or magnesium hydroxide; organic flame retardants such as chlorinated or brominated organic compounds; ground construction waste; ground tire rubber; carbon fibers; or metal fibers or powders (e.g., aluminum, stainless steel). These additives can reinforce, extend, or change electrical, mechanical or compatibility properties. Other additives include lignin, fragrances, coupling agents, compatibilizers, e.g., maleated polypropylene, processing aids, lubricants, e.g., fluorinated polyethylene, plasticizers, antioxidants, opacifiers, heat stabilizers, colorants, foaming agents, impact modifiers, polymers, e.g., degradable polymers, photostabilizers, biocides, antistatic agents, e.g., stearates or ethoxylated fatty acid amines. Suitable antistatic compounds include conductive carbon blacks, carbon fibers, metal fillers, cationic compounds, e.g., quaternary ammonium compounds, e.g., N-(3-chloro-2-hydroxypropyl)-trimethylammonium chloride, alkanolamides, and amines. Representative degradable polymers include polyhydroxy acids, e.g., polylactides, polyglycolides and copolymers of lactic acid and glycolic acid, poly(hydroxybutyric acid), poly(hydroxyvaleric acid), poly[lactide-co-(e-caprolactone)], poly[glycolide-co-(e-caprolactone)], polycarbonates, poly(amino acids), poly(hydroxyalkanoate)s, polyanhydrides, polyorthoesters and blends of these polymers.

When described additives are included, they can be present in amounts, calculated on a dry weight basis, of from below 1 percent to as high as 80 percent, based on total weight of the fibrous material. More typically, amounts range from between about 0.5 percent to about 50 percent by weight, e.g., 5 percent, 10 percent, 20 percent, 30, percent or more, e.g., 40 percent.

Any additives described herein can be encapsulated, e.g., spray dried or microencapsulated, e.g., to protect the additives from heat or moisture during handling.

The fibrous materials, densified fibrous materials, resins or additives may be dyed. For example, the fibrous material can be dyed before combining with the resin and compounding to form composites. In some embodiments, this dyeing can be helpful in masking or hiding the fibrous material, especially large agglomerations of the fibrous material, in molded or extruded parts, when this is desired. Such large agglomerations, when present in relatively high concentrations, can show up as speckles in the surfaces of the molded or extruded parts.

For example, the desired fibrous material can be dyed using an acid dye, direct dye or a reactive dye. Such dyes are available from Spectra Dyes, Kearny, N.J. or Keystone Aniline Corporation, Chicago, Ill. Specific examples of dyes include SPECTRA™ LIGHT YELLOW 2G, SPECTRACID™ YELLOW 4GL CONC 200, SPECTRANYL™ RHODAMINE 8, SPECTRANYL™ NEUTRAL RED B, SPECTRAMINE™ BENZOPERPURINE, SPECTRADIAZO™ BLACK OB, SPECTRAMINE™ TURQUOISE G, and SPECTRAMINE™ GREY LVL 200%, each being available from Spectra Dyes.

In some embodiments, resin color concentrates containing pigments are blended with dyes. When such blends are then compounded with the desired fibrous material, the fibrous material may be dyed in-situ during the compounding. Color concentrates are available from Clariant.

It can be advantageous to add a scent or fragrance to the fibrous materials, densified fibrous or composites. For example, it can be advantageous for the composites smell and/or look like natural wood, e.g., cedarwood. For example, the fragrance, e.g., natural wood fragrance, can be compounded into the resin used to make the composite. In some implementations, the fragrance is compounded directly into the resin as an oil. For example, the oil can be compounded into the resin using a roll mill, e.g., a Banbury® mixer or an extruder, e.g., a twin-screw extruder with counter-rotating screws. An example of a Banbury® mixer is the F-Series Banbury® mixer, manufactured by Farrel. An example of a twin-screw extruder is the WP ZSK 50 MEGAcompounder™, manufactured by Krupp Werner & Pfleiderer. After compounding, the scented resin can be added to the fibrous material and extruded or molded. Alternatively, master batches of fragrance-filled resins are available commercially from International Flavors and Fragrances, under the tradename Polylff™ or from the RTP Company. In some embodiments, the amount of fragrance in the composite is between about 0.005% by weight and about 10% by weight, e.g., between about 0.1% and about 5% or 0.25% and about 2.5%.

Other natural wood fragrances include evergreen or redwood. Other fragrances include peppermint, cherry, strawberry, peach, lime, spearmint, cinnamon, anise, basil, bergamot, black pepper, camphor, chamomile, citronella, eucalyptus, pine, fir, geranium, ginger, grapefruit, jasmine, juniperberry, lavender, lemon, mandarin, marjoram, musk, myrrh, orange, patchouli, rose, rosemary, sage, sandalwood, tea tree, thyme, wintergreen, ylang ylang, vanilla, new car or mixtures of these fragrances. In some embodiments, the amount of fragrance in the fibrous material-fragrance combination is between about 0.005% by weight and about 20% by weight, e.g., between about 0.1% and about 5% or 0.25% and about 2.5%.

While fibrous materials have been described, such as cellulosic and lignocellulosic fibrous materials, other fillers may be used for making the composites. For example, inorganic fillers such as calcium carbonate (e.g., precipitated calcium carbonate or natural calcium carbonate), aragonite clay, orthorhombic clays, calcite clay, rhombohedral clays, kaolin, clay, bentonite clay, dicalcium phosphate, tricalcium phosphate, calcium pyrophosphate, insoluble sodium metaphosphate, precipitated calcium carbonate, magnesium orthophosphate, trimagnesium phosphate, hydroxyapatites, synthetic apatites, alumina, silica xerogel, metal aluminosilicate complexes, sodium aluminum silicates, zirconium silicate, silicon dioxide or combinations of the inorganic additives may be used. The fillers can have, e.g., a particle size of greater than 1 micron, e.g., greater than 2 micron, 5 micron, 10 micron, 25 micron or even greater than 35 microns.

Nanometer scale fillers can also be used alone, or in combination with fibrous materials. The fillers can be in the form of, e.g., a particle, a plate or a fiber. For example, nanometer sized clays, silicon and carbon nanotubes, and silicon and carbon nanowires can be used. The filler can have a transverse dimension less than 1000 nm, e.g., less than 900 nm, 800 nm, 750 nm, 600 nm, 500 nm, 350 nm, 300 nm, 250 nm, 200 nm, less than 100 nm, or even less than 50 nm.

In some embodiments, the nano-clay is a montmorillonite. Such clays are available from Nanocor, Inc. and Southern Clay products, and have been described in U.S. Pat. Nos. 6,849,680 and 6,737,464. The clays can be surface treated before mixing into, e.g., a resin or a fibrous material. For example, the clay can be surface is treated so that its surface is ionic in nature, e.g., cationic or anionic.

Aggregated or agglomerated nanometer scale fillers, or nanometer scale fillers that are assembled into supramolecular structures, e.g., self-assembled supramolecular structures can also be used. The aggregated or supramolecular fillers can be open or closed in structure, and can have a variety of shapes, e.g., cage, tube or spherical.

Structures

Any composite described herein can be in the form of articles such as pipes, panels, decking materials, boards, housings, sheets, blocks, bricks, poles, fencing, members, doors, shutters, awnings, shades, signs, frames, window casings, backboards, flooring, tiles, railroad ties, trays, tool handles, stalls, films, wraps, tapes, boxes, baskets, racks, casings, binders, dividers, walls, mats, flames, bookcases, sculptures, chairs, tables, desks, toys, games, pallets, wharves, piers, boats, masts, septic tanks, automotive panels, computer housings, above- and below-ground electrical casings, furniture, picnic tables, benches, shelters, trays, hangers, servers, caskets, book covers, canes, crutches, house wares and structures.

Radiation Crosslinked Composites

Figure 26:
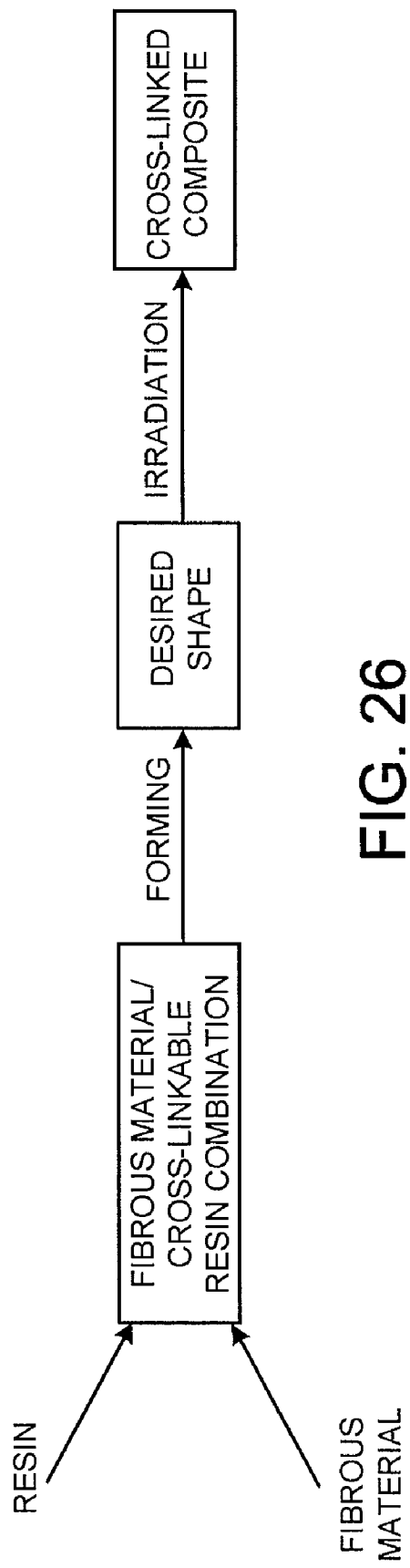
FIG. 26 is a block diagram illustrating conversion of a fibrous material/cross-linkable resin combination into a desired shape, and irradiating the desired shape to form a cross-linked composite.

Referring to FIG. 26, radiation cross-linked composites can be made, e.g., by combining a fibrous material that includes discrete fibers with a radiation cross-linkable resin, e.g., a thermoplastic resin (e.g., a high melt flow rate polypropylene) to provide a fibrous material/cross-linkable resin combination. The fibrous material can have, e.g., an average length-to-diameter ratio of greater than 5, and a standard deviation of a fiber length that is, e.g., less than eighty five percent of an average fiber length. The fibrous material/cross-linkable resin is formed, e.g., using extrusion or injection molding, into a desired shape, e.g., a decking board, and is irradiated, e.g., with an ionizing radiation (e.g., an electron beam, x-ray radiation or gamma radiation) to at least partially cross-link the cross-linkable resin.

Figure 27:
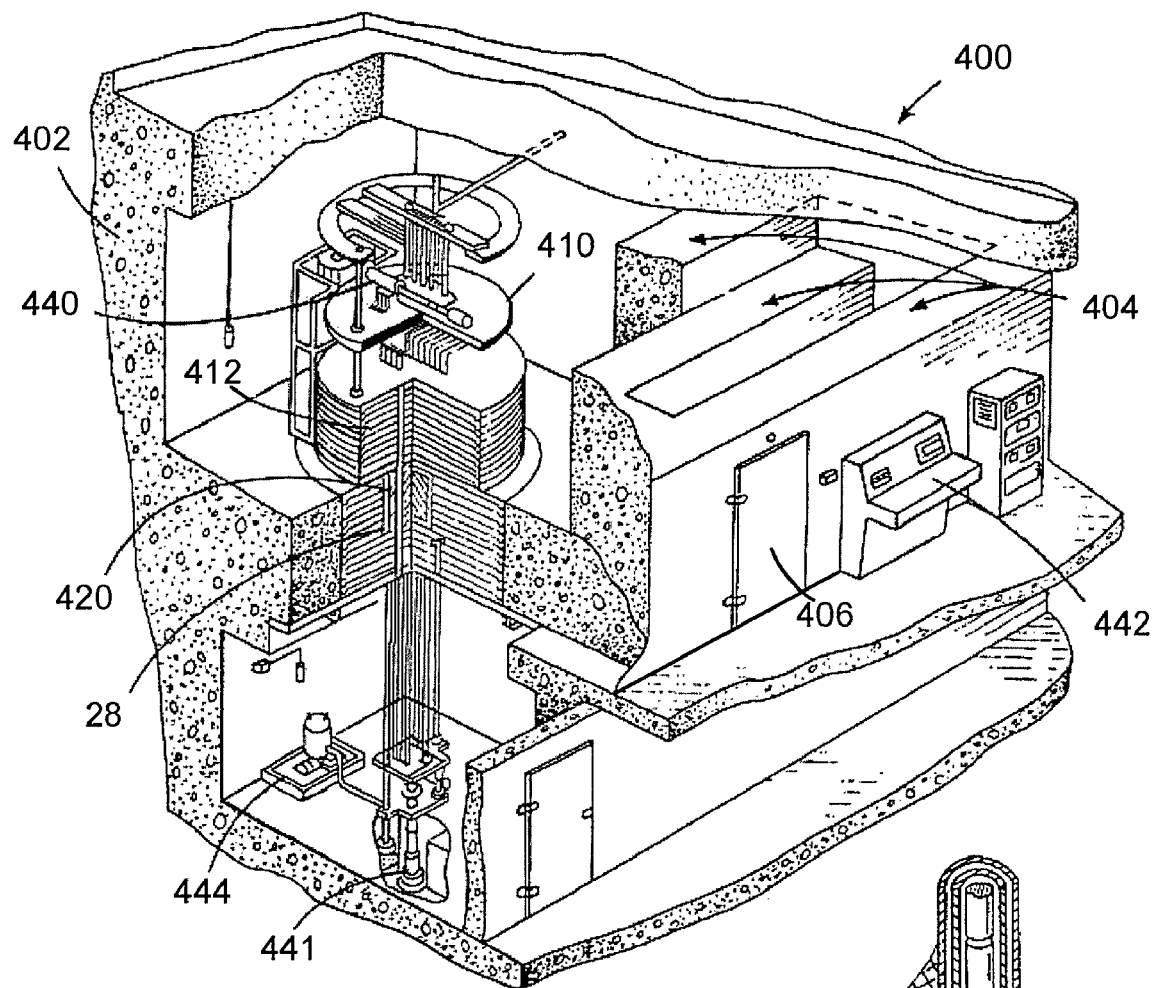
FIG. 27 is a perspective, cut-away view of a gamma irradiator.
Figure 28:
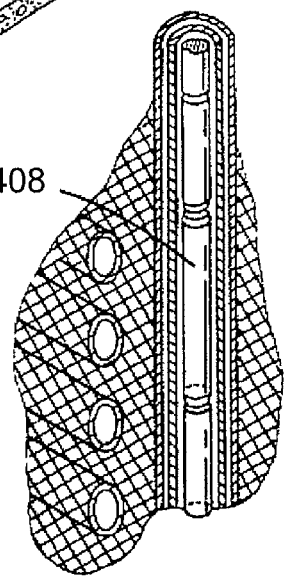
FIG. 28 is an enlarged perspective view of region 28 of FIG. 27.

In specific embodiments, gamma radiation is employed to cross-link the cross-linkable resin. Referring to FIGS. 27 and 28, a gamma irradiator 400 includes gamma radiation sources 408, e.g., $^{60}$Co pellets, a working table 410 for holding the composite to be irradiated and storage 412, e.g., made of a plurality iron plates, all of which are housed in a concrete containment chamber 402 that includes a maze entranceway 404 beyond a lead-lined door 406. Storage 412 includes a plurality of channels 420, e.g., sixteen or more channels, allowing the gamma radiation sources 408 to pass through storage 412 on their way proximate the working table 410.

In operation, the composite to be irradiated is placed on working table 410. The irradiator is configured to deliver the desired dose rate and monitoring equipment is connected to experimental block 440. The operator then leaves the containment chamber 402, passing through the maze entranceway 404 and through the lead-lined door 406. The operator mans a control panel 442, instructing a computer to lift the radiation sources 408 into working position using cylinder 441 attached to a hydraulic pump 444.

In embodiments in which the irradiating is performed with electromagnetic radiation (e.g., as above), the electromagnetic radiation can have, e.g., energy per photon (in electron volts) of greater than $10^2$ eV, e.g., greater than $10^3$, $10^4$, $10^5$, $10^6$, or even greater than $10^7$ eV. In some embodiments, the electromagnetic radiation has energy per photon of between $10^4$ and $10^7$, e.g., between $10^5$ and $10^6$ eV. The electromagnetic radiation can have a frequency of, e.g., greater than $10^{16}$ hz, greater than $10^{17}$ hz, $10^{18}$, $10^{19}$, $10^{20}$, or even greater than $10^{21}$ hz. In some embodiments, the electromagnetic radiation has a frequency of between $10^{18}$ and $10^{22}$ hz, e.g., between $10^{19}$ to $10^{21}$ hz.

In some embodiments, a beam of electrons is used as the radiation source. Electron beams can be generated, e.g., by electrostatic generators, cascade generators, transformer generators, low energy accelerators with a scanning system, low energy accelerators with a linear cathode, linear accelerators, and pulsed accelerators. Electrons as an ionizing radiation source can be useful, e.g., for composites having relatively thin cross-sections, e.g., less than 0.5 inch, e.g., less than 0.4 inch, 0.3 inch, 0.2 inch, or less than 0.1 inch. In some embodiments, the energy of each electron of the electron beam is from about 0.3 MeV to about 2.0 MeV (million electron volts), e.g., from about 0.5 MeV to about 1.5 MeV, or from about 0.7 MeV to about 1.25 MeV.

In some embodiments, the irradiating (with any radiation source) is performed until the fibrous material/cross-linkable resin combination receives a dose of at least 0.25 Mrad, e.g., at least 1.0 Mrad, at least 2.5 Mrad, at least 5.0 Mrad, or at least 10.0 Mrad. In some embodiments, the irradiating is performed until the fibrous material/cross-linkable resin combination receives a dose of between 1.0 Mrad and 6.0 Mrad, e.g., between 1.5 Mrad and 4.0 Mrad.

In some embodiments, the irradiating is performed at a dose rate of between 5.0 and 1500.0 kilorads/hour, e.g., between 10.0 and 750.0 kilorads/hour or between 50.0 and 350.0 kilorads/hours.

The radiation cross-linkable resin can be, e.g., a thermoplastic or a thermoset (e.g., a cast thermoset). For example, the radiation cross-linkable resin can be a polyolefin, e.g., a polyethylene (e.g., a copolymer of polyethylene), a polypropylene (e.g., a copolymer of polypropylene), a polyester (e.g., polyethylene terephthalate), a polyamide (e.g., nylon 6, 6/12 or 6/10), a polyethyleneimine, elastomeric styrenic copolymers (e.g., styrene-ethylene-butylene-styrene copolymers), a polyamide elastomer (e.g., polyether-polyamide copolymer), ethylene-vinyl acetate copolymer, cast polyurethane, cast silicone, or compatible mixtures of these resins.

In some specific embodiments, the resin is a polyolefin that has a polydispersity of greater than 2.0, e.g., greater than 3.0, greater than 3.5, greater than 4.0, greater than 4.5, greater than 5.0, greater than 7.5 or even greater than 10.0 (measured using high temperature gel permeation chromatography against polystyrene standards; see, e.g., ASTM D6474-99). A high polydispersity can improve impact resistance in the cross-linked composite. In some embodiments, the polyolefin has a melt flow rate greater than 10.0 g/10 minutes, e.g., greater than 15.0, greater than 20.0, greater than 25.0, greater than 30.0, or even greater than 50.0 g/10 minutes (measured using ASTM D1238, 230° C./2.16 kg). A high melt flow can aid in the production of the composite, e.g., by reducing shear heating during the forming of the composite.

In a specific embodiment, the resin is a 50:50 weight percent blend of 20 melt flow rate (MFR) polypropylene and 50 MFR polypropylene. Polypropylenes are available from Sunoco Chemical.

The crosslinked composites can include any or any combination of the fillers and/or additive disclosed herein.

While the embodiment of FIG. 27 illustrates a "dry" containment system, water containment systems are possible.

While the embodiment of FIG. 27 illustrates irradiation of a composite under ambient conditions, the composite can be cooled during the irradiation. While the embodiment of FIG. 27 illustrates irradiation in normal atmospheric air, irradiation can take place in an inert atmosphere, e.g., nitrogen or argon atmosphere.

Radiation chemistry is described by Ivanov in "Radiation Chemistry of Polymers (translation from Russian)," VSP Press BV, Ultrech, The Netherlands, (ISBN 90-6764-137-5), 1992.

Composites Having Certain Visual Attributes

Figure 29:
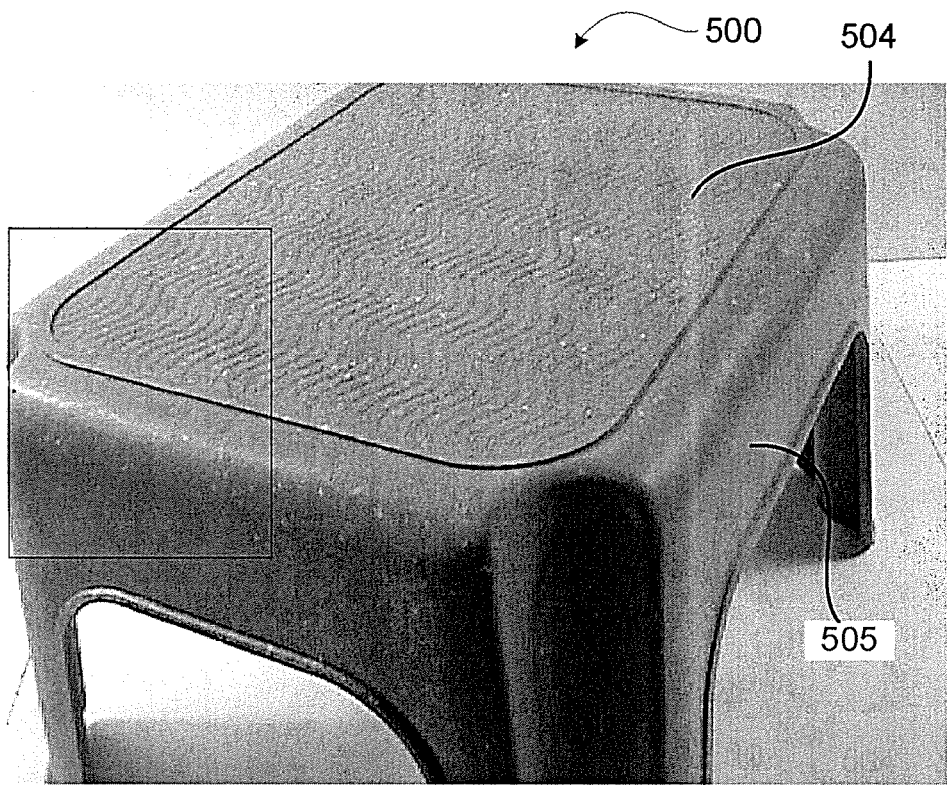
FIG. 29 is a photograph of a resin/fibrous material composite in the form of a step stool in which some of the fibrous material of the composite is visible.
Figure 30:
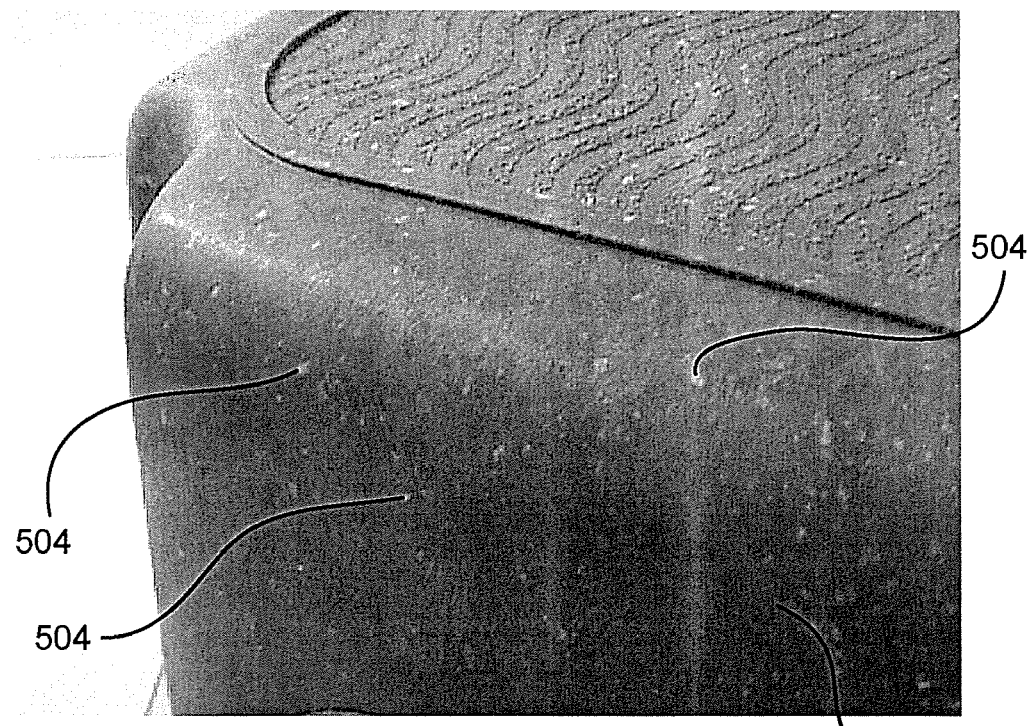
FIG. 30 is an enlarged view of the box region of FIG. 29.

Referring to FIGS. 29 and 30, a composite 500, e.g., in the form of a step stool (as shown), includes a resin and a fibrous material 504 and has an external surface 505. Some of the fibrous material is visible on, in, or just beneath the external surface of the composite. Such composites can have unique, pleasing or even striking visual properties, and at the same time can have desirable mechanical properties, e.g., flexural strength and impact resistance.

The composite can be made, e.g., by combining a resin and a fibrous material 14 to provide a resin/fibrous material combination, and compressing the resin/fibrous material combination to provide the composite having the external surface. Generally, the resin, the fibrous material and the conditions for forming the composite are chosen such that fibrous material is visible in, on or just beneath the external surface, rather than being deeply buried below the surface where it would not be visible. For example, for an opaque or translucent material, fibrous material is visible beneath the exterior surface of the composite when the fibrous material is under the exterior surface, e.g., a distance of less than 0.100 inch, e.g., less than 0.050 inch, less than 0.025 inch, less than 0.010 inch, less than 0.005 inch, less than 0.0025 inch, or a distance of less than 0.001 inch.

The composites can be made using any plastic processing machinery, e.g., injection molding equipment and compression molding equipment or extrusion equipment.

The resin can be a thermoplastic or a thermoset. When the resin is a thermoplastic, it can be, e.g., a polyolefin, such as a polyethylene (e.g., a copolymer of polyethylene), or a polypropylene (e.g., a copolymer of polypropylene); a polyester, such as polyethylene terephthalate (PET); a polyamide, such as nylon 6, 6/12 or 6/10; an elastomeric styrenic copolymer, such as a styrene-ethylene-butylene-styrene copolymer; a polyamide elastomers, such as polyether-polyamide copolymer; an ethylene-vinyl acetate copolymer; or mixtures of these resin.

To provide the unique composites, it is often desirable to use a relatively viscous resin, which can enhance fiber visibility by preventing the fibrous material from "slipping" beneath the external surface where it would be hidden from view.

In some implementations, the resin is a polyolefin, e.g., a polypropylene, having a melt flow rate of less than 50 g/10 minutes, e.g., less than 25 grams/10 minutes, less than 20 grams/10 minutes, less than 17 g/10 minutes, less than 15 grams/10 minutes, less than 10 g/10 minutes, less than 7.5 grams/10 minutes, less than 5 g/10 minutes, less than 2.5 grams/10 minutes, or even less than 1 g/10 minutes. The lower limit of the melt flow will depend upon the processing technique used to form the composite, e.g., injection molding or extrusion. For injection molding, it can be desirable that the melt flow rate be greater than 0.5 grams/10 minutes. For compression molding and extrusion, it can be desirable to that the melt flow rate be greater than 0.1 grams/10 minutes. Melt flow rats are measured using ASTM D1238 at 230° C. and 2.16 kg, the disclosure of which is hereby incorporated by reference herein in its entirety.

The fibrous material used can be, e.g., a densified fibrous material made by application of pressure to a fibrous material (optionally having a binder), e.g., by passing the fibrous material through a nip defined between counter-rotating pressure rolls or by passing the fibrous material through a pellet mill, as discussed above. The densified fibrous material can be, e.g., in the form of pellets or chips or other geometries having a variety of shapes. The density of the densified fibrous material can be, e.g., greater than 0.11 $g/cm^3$, e.g., greater than 0.15 $g/cm^3$, greater than 0.20 $g/cm^3$, greater than 0.25 $g/cm^3$, greater than 0.3 $g/cm^3$, greater than 0.4 $g/cm^3$, greater than 0.5 $g/cm^3$, or even greater than 0.6 $g/cm^3$. It is desirable to select a density such that the densified material "comes apart" under shear and/or heat to release the fibrous material or agglomerated fibrous material. Generally, it is desirable that the densified fibrous material have a density of less than 0.9 $g/cm^3$.

The fibers of the fibrous materials can have a relatively large average length-to-diameter ratio (e.g., greater than 20-to-1). The average length-to-diameter ratio of the second fibrous material 14 can be, e.g. greater than 10/1, e.g., greater than 25/1 or greater than 50/1. An average length of the second fibrous material 14 can be, e.g., between about 0.5 mm and 2.5 mm, e.g., between about 0.75 mm and 1.0 mm, and an average width (i.e., diameter) of the second fibrous material 14 can be, e.g., between about 5 μm and 50 μm, e.g., between about 10 μm and 30 μm.

To enhance the "speckled" appearance of the composites, it is often desirable that the fibrous materials have a relatively large percentage of fibers greater than 2.5 mm in length. For example, at least 2.5 percent by weight of the fibrous material is fibers having a length greater than 2.5 mm, e.g., at least 5.0 percent by weight of the fibrous material is fibers having a length greater than 2.5 mm, at least 7.5 percent by weight of the fibrous material is fibers have a length greater than 2.5 mm, or at least 10.0 percent by weight of the fibrous is fibers having length greater than 2.5 mm. In any of these situations, e.g., so as not to adversely affect processability, less than 25 percent by weight of the fibrous material is fibers having a length greater than 2.5 mm.

For an opaque or translucent resin material, the composite can have, e.g., greater than 20 percent by weight fibrous material, e.g., greater than 30 percent, greater than 40 percent, greater than 50 percent, greater than 55 percent or even greater than 60 by weight fibrous material. For any of the implementations of this paragraph, the composites generally have less than 70 percent by weight fibrous material.

If desired, the fibrous material can be colored, e.g., to enhance the strength of the visual effect. The fibrous material can be colored, e.g., by dying, before combining with the resin and to form the composites. In some implementations, this dyeing can, e.g., enhance visibility of the fibrous material in the external surface, especially large agglomerations of fibrous material.

In some implementations, the resin can be colored, e.g., with a pigment or dye, to enhance the contrast between the fibrous material (colored or natural) and the resin, e.g., to enhance the overall strength of the visual effect. Color concentrates are available from Clariant.

Any of these composites having certain visual attributes can include any of the additives described herein, including fragrances.

The composite can be formed into a variety of shapes, such as those described above.

When the composites are injection molded, it is often desirable to "freeze" the molten resin quickly, e.g., by forming the composite against a relatively cool mold surface, so that the fibers do not have time to "sink" under the surface of the resin where they would be hidden from sight. Referring to FIGS. 31A-31C, "speckled" composites can be prepared by forming a composite 600 by compressing a molten resin against a mold 602 having a cooled surface 604, and then demolding the formed composite 600. In some implementations, the compressing is performed against a mold surface having a temperature of less than 100° C., e.g., less than 75° C., less than 50° C., less than 25° C., or less than 15° C.

Still other composites having unique, pleasing or even striking visual properties and desirable mechanical properties include a transparent resin and a fibrous material. In some implementations, the fibrous material can be seen within the composite. Generally, to make such composites a transparent resin and a fibrous material are combined to provide a transparent resin/fibrous material combination and the transparent resin/fibrous material combination is compressed, e.g., in an extruder or in an a mold, to provide the composite.

The resin can be a thermoplastic or a thermoset. When the resin is a thermoplastic, it can be, e.g., a clarified polyolefin, such as a clarified polypropylene (e.g., a polypropylene copolymer); a polyester, such as polyethylene terephthalate (PET); an amorphous polyamide; a polycarbonate; a styrenic polymer, such as styrene-acrylonitrile-copolymer (SAN); a polyacrylate, such as polymethylmethacrylate (PMMA).

Clarifying agents for polyolefins are available from Milliken Chemical under the trade name MILLAD®, e.g., MILLAD® 3988. Clarified polyolefin colorants are also available from Milliken Chemical under the trade name CLEARTINT®.

To enhance the effect with a transparent resin, it is often desirable that the resin have a spectral transmission of greater than 60 percent, e.g., greater than 65 percent, greater than 70 percent, greater than 75 percent, greater than 80 percent, greater than 85 percent, or even greater than 90 percent. In addition, it is also often desirable for the resin to have a haze of less than 40 percent, e.g., less than 35 percent, less than 30 percent, less than 25 percent, less than 20 percent, less than 15 percent, or even less than 10 percent. Both spectral transmission and haze are measured using ASTM D1003-92, which is hereby incorporated by reference herein in its entirety.

To enhance the effect with a transparent resin, it is often desirable that the composite have a relatively low content of fibrous material, e.g., less than about 20 percent by weight fibrous material, less than 17.5 percent, less than 15 percent, less than 12.5 percent, less than 10 percent, less than 7.5 percent, less than 5 percent, less than 2.5 percent, or even less than 1 percent by weight fibrous material. A relatively low fiber content allows light to pass through the composite so that masses of fibrous material can be seen inside the composite.

Referring to FIG. 32, a resin/fibrous material composite can have an inner portion 610 that includes a first resin that has substantially no fibrous material and an outer portion 612 that includes a second resin that surrounds the inner portion and that includes substantially all of the fibrous material. Such a composite can be made, e.g., by co-molding or co-extrusion. Any of the above described fibrous materials or additives can be used in preparing such a composite. Such composites can be formed in any of the shapes described above. The first and second materials can be the same or different, and can be, e.g., any of the resins described above.

Referring to FIG. 33, a transparent resin/fibrous material composite can have an inner portion 620 having a first resin and substantially all of the fibrous material and an outer portion 622 surrounding the inner portion having a second resin and having substantially no fibrous material. Any of the above described fibrous materials or additives can be used with used in preparing such a composite. Such composites can be formed in any of the shapes described above. The first and second materials can be the same or different, and can be, e.g., any of the resins described above.

A number of embodiments have been described. Nevertheless, it will be understood that various modifications may be made without departing from the spirit and scope of the invention. Accordingly, other embodiments are within the scope of the following claims.

What is claimed is:

1. A method of making a fibrous material, the method comprising:
    shearing a first fiber source, selected from the group consisting of paper, grasses, rice hulls, bagasse, cotton, jute, hemp, flax, bamboo, sisal, abaca, straw, corn cobs, rice hulls, coconut hair and mixtures thereof, without dispersing the fiber source in water, to release fibers from the fiber source and thereby provide a first fibrous material;
    passing the fibrous material through a first screen having an opening size of ⅛ inch (3.175 mm ) or less, to provide a second fibrous material, the second fibrous material having a porosity of greater than 70% and a BET surface area of greater than 0.5 m2/g; and then
    shearing the second fibrous material again to provide a third fibrous material.

2. The method of claim 1 further comprising collecting the second fibrous material.

3. The method of claim 2 wherein the second fibrous material is collected in a bin having a pressure below nominal atmospheric pressure.

4. The method of claim 3 wherein the pressure is at least 10 percent below nominal atmospheric pressure.

5. The method of claim 3 wherein the pressure is at least 50 percent below nominal atmospheric pressure.

6. The method of claim 1 further comprising passing the third fibrous material through a screen.

7. The method of claim 6 wherein the third fibrous material is passed through a second screen having an average opening size less than an average opening size of the first screen.

8. The method of claim 1 further comprising, before shearing the second fibrous material, passing the second fibrous material through a second screen having an average opening size less than an average opening size of the first screen.

9. The method of claim 1 wherein the fiber source comprises a cellulosic material or a lignocellulosic material.

10. The method of claim 1 wherein the first screen has an average opening size of 1.59 mm or less.

11. The method of claim 1 wherein the first screen has an average opening size of 0.79 mm or less.

12. A method of making a fibrous material, the method comprising:
    shearing a first fiber source, selected from the group consisting of paper, grasses, rice hulls, bagasse, cotton, jute, hemp, flax, bamboo, sisal, abaca, straw, corn cobs, rice hulls, coconut hair and mixtures thereof, without dispersing the fiber source in water, to release fibers from the fiber source and thereby provide a first fibrous material;
    passing the fibrous material through a first screen having an opening size of ⅛ inch (3.175 mm) or less, to provide a second fibrous material;

collecting the second fibrous material in a receiving area having a pressure below nominal atmospheric pressure, the second fibrous material having a porosity of greater than 70% and a BET surface area of greater than 0.5 m2/g; and then shearing the second fibrous material again to provide a third fibrous material.

13. The method of claim 12 further comprising passing the third fibrous material through a screen.

14. The method of claim 13 wherein the third fibrous material is passed through a second screen having an average opening size less than an average opening size of the first screen.

15. The method of claim 12 further comprising passing the second fibrous material through a second screen having an average opening size less than the first screen.

* * * * *